United States Patent [19]
Lukas et al.

[11] Patent Number: 5,918,268
[45] Date of Patent: Jun. 29, 1999

[54] LINE LEAK DETECTION

[75] Inventors: Paul Lukas, Old Orchard Beach; Daniel F. Gagnon, Westbrook; Daniel Johnson, N. Waterboro; Christopher D. Farrar, Saco; John D. Knight, Scarborough; John J. Gillis, Falmouth, all of Me.

[73] Assignee: Intelligent Controls, Inc., Saco, Me.

[21] Appl. No.: 08/871,394

[22] Filed: Jun. 9, 1997

Related U.S. Application Data

[63] Continuation of application No. 08/499,179, Jul. 7, 1995, abandoned.

[51] Int. Cl.[6] .............................. G01F 1/68; G01F 5/00; G01M 3/28
[52] U.S. Cl. .................... 73/40.5 R; 73/204.22; 73/49.1; 73/202.5; 340/605
[58] Field of Search ................ 73/40.5 R, 49.7, 73/204.22, 202.5, 49.1, 38; 340/605

[56] References Cited

U.S. PATENT DOCUMENTS

| | | | |
|---|---|---|---|
| 2,043,227 | 6/1936 | Bennett | 137/77 |
| 2,771,769 | 11/1956 | Nielsen | 73/40 |
| 2,853,874 | 9/1958 | Mennesson | 73/40 |
| 3,085,423 | 4/1963 | Champion | 73/40.5 |
| 3,439,837 | 4/1969 | Hearn et al. | 222/52 |
| 3,454,195 | 7/1969 | Deters | 222/52 |
| 3,793,876 | 2/1974 | Oswald | 73/46 |
| 3,803,912 | 4/1974 | Ohno | 73/195 |
| 3,817,087 | 6/1974 | Mooney | 73/40.5 |
| 3,817,097 | 6/1974 | Heroux | 73/168 |
| 3,940,020 | 2/1976 | McCrory et al. | 222/52 |
| 3,969,923 | 7/1976 | Howell | 73/40.5 |
| 3,978,709 | 9/1976 | Ando | 73/40.5 R |
| 4,043,355 | 8/1977 | Cerruti et al. | 137/312 |
| 4,051,716 | 10/1977 | Mooney | 73/40.5 |
| 4,131,216 | 12/1978 | Gerstenmaier et al. | 222/52 |
| 4,461,173 | 7/1984 | Olin | 73/203 |
| 4,517,838 | 5/1985 | Wachi et al. | 73/204 |
| 4,518,955 | 5/1985 | Meyer | 340/605 |
| 4,562,731 | 1/1986 | Nishimura et al. | 73/202 |
| 4,571,996 | 2/1986 | Wakeman et al. | 73/202 |
| 4,599,890 | 7/1986 | Girone et al. | 73/37 |
| 4,648,270 | 3/1987 | Johnson et al. | 73/202 |
| 4,727,748 | 3/1988 | Horigome et al. | 73/40 |
| 4,817,415 | 4/1989 | Mooney | 73/40.5 R |
| 4,847,599 | 7/1989 | Imiolex et al. | 340/605 |
| 4,876,530 | 10/1989 | Hill et al. | 340/605 |

(List continued on next page.)

FOREIGN PATENT DOCUMENTS

| | | |
|---|---|---|
| 136815 | 4/1902 | Germany. |
| 910682 | 7/1949 | Germany. |
| 1073590 | 2/1984 | U.S.S.R.. |

OTHER PUBLICATIONS

Nancy D. Wolff, "Service Station Pipeline Leak Detectors" Conducted by the California State Water Resources Control Board, Chevron U.S.A. Jul. 20–Aug. 25, 1988. 17 pages.

*Primary Examiner*—Hezron Williams
*Assistant Examiner*—J. David Wiggins
*Attorney, Agent, or Firm*—Fish & Richardson P.C.

[57] ABSTRACT

A flow measuring device for indicating the leak status of a pressurized fluid-carrying line pressurized by a pump includes an electronic leak sensing module connected in fluid communication with the pressurized line and configured for insertion within a detection port of a pump manifold. The module includes a thermal sensor effected by flow through the pressurized line, whereby leaks in the pressurized line are detected by monitoring the thermal sensor for changes in output signal that correspond to flow through the pressurized fluid-carrying line. The flow measuring device includes a system control unit for monitoring the electronic leak sensing module and indicating the leak status of the pressurized line. Wires which provide power to the leak sensing module, the system control unit and the pump for pressurizing the pressurized line are also used for communication.

38 Claims, 16 Drawing Sheets

U.S. PATENT DOCUMENTS

| | | | |
|---|---|---|---|
| 4,916,948 | 4/1990 | Inada et al. | 73/202.5 |
| 4,942,758 | 7/1990 | Cofield | 73/49.2 |
| 4,942,763 | 7/1990 | Harpster | 73/202.5 |
| 4,966,190 | 10/1990 | Geisinger | 137/613 |
| 4,982,602 | 1/1991 | Stiefel et al. | 73/118.2 |
| 5,014,543 | 5/1991 | Franklin et al. | 73/40.5 |
| 5,027,849 | 7/1991 | Diesener | 137/236.1 |
| 5,042,290 | 8/1991 | Geisinger | 73/40.5 R |
| 5,050,634 | 9/1991 | Feichtner | 137/486 |
| 5,062,442 | 11/1991 | Stenstrom et al. | 137/110 |
| 5,072,621 | 12/1991 | Hasselmann | 73/40.5 R |
| 5,090,234 | 2/1992 | Maresca, Jr. et al. | 73/49.1 |
| 5,091,716 | 2/1992 | Nelson et al. | 340/605 |
| 5,103,410 | 4/1992 | Slocum et al. | 364/558 |
| 5,131,262 | 7/1992 | Wood et al. | 73/40.5 |
| 5,158,207 | 10/1992 | Van Daele | 222/52 |
| 5,159,829 | 11/1992 | Mayer et al. | 73/38 |
| 5,189,904 | 3/1993 | Maresca, Jr. et al. | 73/40.5 |
| 5,201,212 | 4/1993 | Williams | 73/40.5 |
| 5,272,646 | 12/1993 | Farmer | 364/509 |
| 5,279,154 | 1/1994 | Vavra et al. | 73/202.5 |
| 5,279,155 | 1/1994 | Johnson et al. | 73/202.5 |
| 5,309,762 | 5/1994 | Satoh et al. | 73/204.22 |
| 5,317,899 | 6/1994 | Hutchinson et al. | 73/40.5 |
| 5,325,706 | 7/1994 | Grose | 73/40.5 |
| 5,330,073 | 7/1994 | Collins et al. | 222/52 |
| 5,333,115 | 7/1994 | Clouser et al. | 364/558 |
| 5,343,737 | 9/1994 | Baumoel | 73/40.5 |
| 5,372,032 | 12/1994 | Filippi et al. | 73/40.5 |
| 5,375,454 | 12/1994 | Andrejasich et al. | 73/40.5 |
| 5,383,357 | 1/1995 | Doll | 73/118.2 |
| 5,408,420 | 4/1995 | Slocum et al. | 364/558 |
| 5,410,912 | 5/1995 | Suzuki | 73/204.15 |
| 5,461,910 | 10/1995 | Hodson et al. | 73/170.12 |
| 5,511,573 | 4/1996 | Corte | 137/15 |
| 5,526,679 | 6/1996 | Filippi et al. | 73/40.5 |
| 5,537,870 | 7/1996 | Zurek et al. | 73/202 |

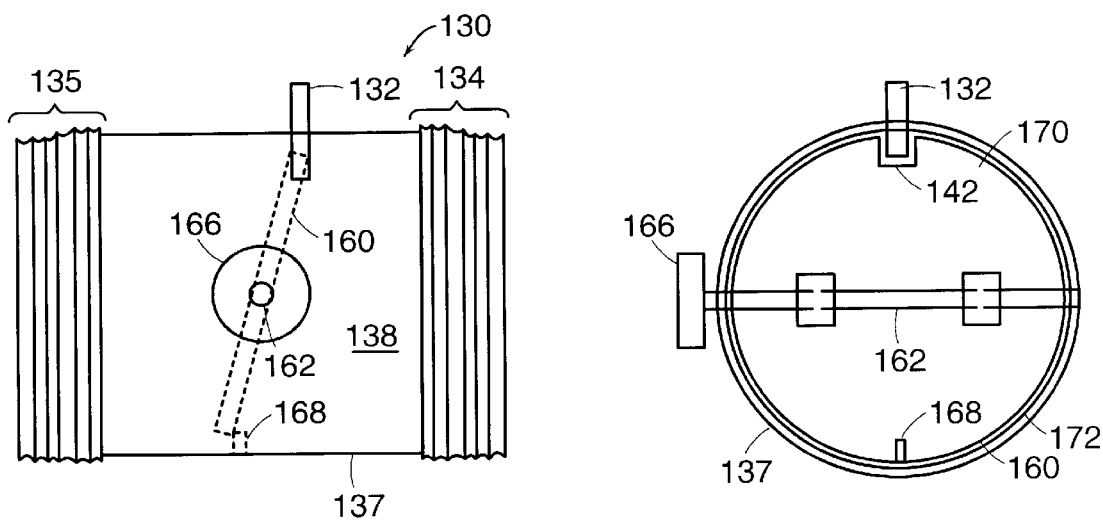
FIG. 9
FIG. 9a
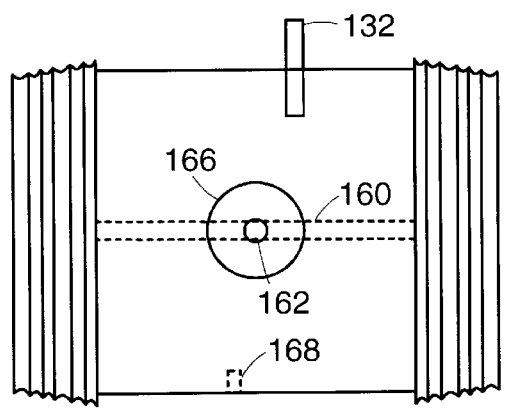
FIG. 9b

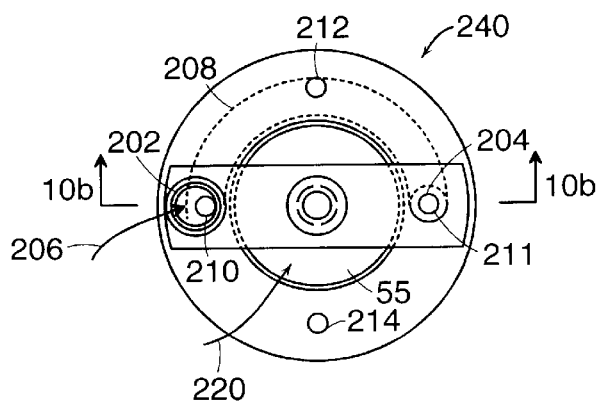
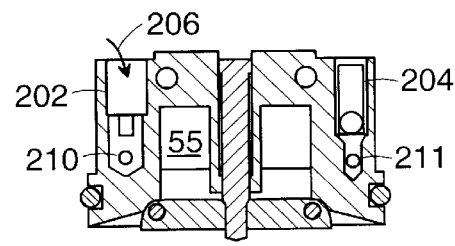
FIG. 10b
FIG. 10a
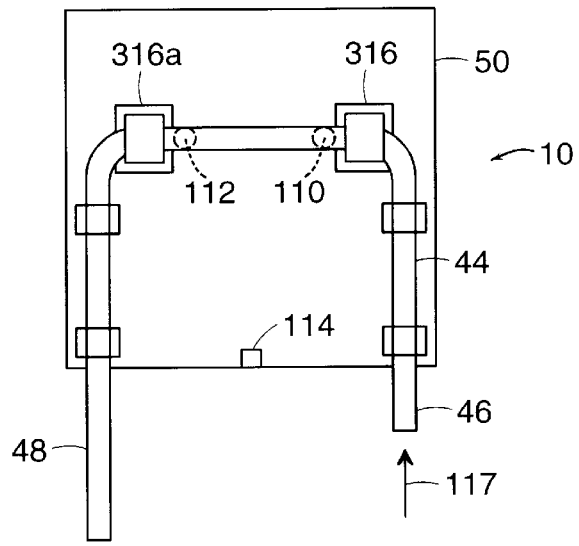
FIG. 11

LINE LEAK DETECTION

This application is a continuation of application Ser. No. 08/499,179, filed Jul. 7, 1995, now abandoned.

The present invention relates to the detection of a leak from a pressurized line.

Fuel delivery systems (i.e., gasoline, diesel and other such liquids) typically include a storage tank, pipeline and a dispenser. A submersible pump in the storage tank delivers the fuel through the pipeline to the dispenser. A check valve keeps the pipeline full of fuel, typically at 10–14 PSI, to provide immediate and accurate fuel dispensing upon activation of the dispenser. If there is a leak in the pipeline, a significant amount of fuel can be discharged into the ground.

Current Environmental Protection Agency regulations require that fuel delivery systems be tested for a leak rate of 0.1 gallons/hour (GPH) annually, 0.2 GPH monthly, and 3.0 GPH hourly.

It is an object of the invention to provide improved methods and means for leak detection.

According to one aspect of the invention, a flow measuring device for indicating the leak status of a pressurized fluid-carrying line pressurized by a pump, includes an electronic leak sensing module connected in fluid communication with the pressurized line and configured for insertion within a detection port of a pump manifold. The module includes a thermal sensor effected by flow through the pressurized line, whereby leaks in the pressurized line are detected by monitoring the thermal sensor for changes in output signal that correspond to flow through the pressurized fluid-carrying line.

According to another aspect of the invention, a system control unit monitors the electronic leak sensing module and indicates the leak status of the pressurized line.

According to another aspect of the invention, the electronic leak sensing module includes a housing defining a flow delivery passage having an input and an output coupled to the pressurized line and a detection passage coupled to the flow delivery passage. The thermal sensor is located along the detection passage.

According to another aspect of the invention, the housing includes a detection conduit enclosing and defining the pathway of the detection passage and the thermal sensor is located on the detection conduit.

According to another aspect of the invention, a deflector plate is disposed in the housing within the flow delivery passage to have a fluid flow switch function. The deflector plate has a first flow deflection position preventing flow through the flow delivery passage while allowing flow through the detection passage and a second flow position allowing flow through the delivery passage. A biasing element, for example, a spring, biases the deflector plate toward the first flow deflection position. Fluid flow through the pipeline above a predetermined value causes the deflector plate to move to the second flow position.

According to another aspect of the invention, a temperature controller is located on the detection conduit for controlling the temperature of the detection conduit. The temperature controller includes a heater for heating the detection conduit. The heater is a coil of nichrome wire wound around the detection conduit.

According to another aspect of the invention, the thermal sensor includes a first thermal element located on an upstream side of the heater and a second thermal element located on a downstream side of the heater.

According to another aspect of the invention, a check valve is located in a path of fluid entering the detection passage. The housing defines a channel in fluid communication with the check valve and the detection passage. A relief valve is located in the path of fluid entering the detection passage.

According to another aspect of the invention, the device is a stand-alone unit located in the detection port of the pump manifold.

According to another aspect of the invention, a third thermal element is located on the housing such that the third thermal element indicates a temperature of the housing which is unaffected by the temperature controller.

According to another aspect of the invention, a microprocessor controls the heater. The microprocessor receives a signal from the third thermal element and a signal from the thermal sensor and provides a control signal to the heater representative of a first temperature difference between the detection conduit and the housing to control the heater to establish the first temperature difference at a desired predetermined value.

According to another aspect of the invention, the signal from the thermal sensor comprises a signal from the first thermal element representative of a temperature of the detection conduit on the upstream side of the heater.

According to another aspect of the invention, the signal from the thermal sensor comprises a signal from the second thermal element representative of a temperature of the detection conduit on the downstream side of the heater.

According to another aspect of the invention, the signal from the thermal sensor comprises a signal from the first and second thermal elements representative of an average of a temperature of the detection conduit on the upstream side of the heater and a temperature of the detection conduit on the downstream side of the heater.

According to another aspect of the invention, the control signal comprises a first pulse signal of current pulses of variable pulse widths that are generated at a desired set frequency, the width of each current pulse controlling an amount of electrical energy applied to the heater.

According to another aspect of the invention, a system control unit monitors the electronic leak sensing module.

According to another aspect of the invention, the microprocessor receives a signal from the first and second thermal elements representative of a second temperature difference between the temperatures at the downstream and upstream locations of the detection conduit and provides a second pulse signal to the system control unit representative of the second temperature difference.

According to another aspect of the invention, wires provide power to the leak sensing module and are used to communicate the second pulse signal from the leak sensing module to the system control unit. The wires also provide power to a pump for pressurizing the pressurized line.

According to another aspect of the invention, the microprocessor inserts a first and a second gap into the control signal, the gaps being interruptions in the set frequency in which no pulses are sent to the heater. The second pulse signal is the number of pulses sent to the heater between gaps.

According to another aspect of the invention, the control unit monitors current drawn by the leak sensing module. A spike in the current drawn occurs during each current pulse of the control signal. The control unit interprets the second pulse signal by counting the number of spikes occurring between the gaps.

According to another aspect of the invention, the indicator includes a two digit display for displaying test information, a first LED for indicating when a leak test is being performed, a second LED for indicating when a leak has been detected, and a test/reset button for starting a test and resetting the device. The control unit is retrofitable to a relay box associated with a pump for pressurizing the pressurized line.

According to another aspect of the invention, the pump is a submersible pump for pumping liquid from a tank through the pressurized line to a dispenser. The electronic sensing module is threadably engaged in a line leak port of the pump.

According to another aspect of the invention, a pipeline leak detector apparatus includes a tank which contains a fluid, a dispenser remote from the tank, a fluid conduit connected between the tank and the dispenser, a dispensing valve in the conduit remote from the tank, a pump coupled to the fluid conduit configured to apply fluid under pressure to the fluid conduit, a detector for measuring flow located within a detection port of a pump manifold and configured to measure the flow through the conduit, and a flow concentrator which, in a first, flow deflection position, channels fluid through a detection passage of the detector when the dispenser valve is closed, thus increasing the velocity of the fluid flow through the detection passage of the detector when a leak is present.

According to another aspect of the invention, a leak sensing module for directing fluid flow through a detection passage, the module being in fluid communication with a pressurized line and having a leak detector in the pressurized line, includes a housing defining the detection passage and a flow delivery passage, for example, having a diameter larger than the diameter of the detection passage. The housing including a coupling portion for engagement to a line leak port of a pump which pressurizes the pressurized line. A deflector plate is associated with the housing and a biasing element biases the deflector plate toward the first flow deflection position. Fluid flow through the pipeline above a predetermined value causes the deflector plate to move to the second, flow position.

According to another aspect of the invention, a leak sensing module for directing fluid flow through a detection passage, the module being in fluid communication with a pressurized line and configured to be located between a first section and a second section of the pressurized line, includes a leak detector in the pressurized line. The module includes a housing defining the detection passage and a flow delivery passage. The housing has a first threaded portion for threadably engaging an end of the first section of the pressurized line and a second threaded portion for threadably engaging an end of the second section of the pressurized line.

According to another aspect of the invention, a flow measuring device for testing for leaks in a pressurized line includes an electronic leak sensing module connected in fluid communication with the pressurized line, a system control unit for monitoring the electronic leak sensing module, and power lines over which power is provided to the leak sensing module and over which information is transmitted from the leak sensing module to the system control unit.

According to another aspect of the invention, the power lines also provide power to a pump for pressurizing the pressurized line.

According to another aspect of the invention, the information is transmitted by varying a current drawn on the power lines and the system control unit monitors the current drawn. The current is drawn as a series of pulses. The leak sensing module inserts a first and a second gap in the series of pulses, a predetermined number of pulses between the gaps containing information related to leak rate. A temperature controller includes a heater. The current is drawn by the heater. The current pulses represent serialized digital data.

According to another aspect of the invention, a method for testing for leaks in a pressurized line leading from a tank through a dispenser valve to a dispenser includes providing a flow measuring device comprising an electronic leak sensing module connected in fluid communication with the pressurized line, closing the dispenser valve to prevent delivery of liquid to the dispenser, operating a pump to pressurize the line, and monitoring a thermal sensor to determine flow rate of liquid past the thermal sensor.

According to another aspect of the invention, the method includes setting the temperature of a detection conduit to a desired value different from the initial temperature of the detection conduit, and measuring the time it takes for the temperature detected by the thermal sensor to return to the initial temperature.

According to another aspect of the invention, the method includes applying a predetermined amount of energy to a temperature controller to change the temperature of the detection conduit to a desired value different from the initial temperature of the detection conduit, and measuring the time it takes for the temperature detected by the thermal sensor to reach the desired value.

According to another aspect of the invention, the method includes setting the temperature of the detection conduit to a desired value different from the initial temperature of the detection conduit, and measuring the power required to maintain the temperature at the desired value.

According to another aspect of the invention, the method includes maintaining constant power to the temperature controller by controlling a pulse width of electrical energy sent to the temperature controller.

According to another aspect of the invention, the method includes making successive measurements of flow rate, wherein changing measurements indicate a trend toward thermal stability, and predicting a settling point of the trend toward thermal stability.

According to another aspect of the invention, the method includes measuring a first temperature detected by a first thermal element and a second temperature detected by a second thermal element, and comparing the first temperature and the second temperature to determine flow rate through the delivery passage.

According to another aspect of the invention, the method includes measuring a third temperature detected by a third thermal element, comparing the second temperature and the third temperature to control the temperature controller to maintain the detection conduit at a desired temperature different from the housing temperature, and allowing the detection conduit to reach the desired temperature before determining the flow rate.

According to another aspect of the invention, the method includes measuring the power dissipated by the heater to maintain the elevated temperature to determine flow rate through the delivery passage.

According to another aspect of the invention, a flow measuring device for indicating the leak status of a pressurized fluid-carrying line includes an electronic leak sensing module connected in fluid communication with the pressurized line. The module includes a detection conduit defining a fluid passage in fluid communication with the pressurized line, a first heater in thermal contact with the detection conduit, and a second heater in thermal contact with the detection conduit located downstream of the first heater. Leaks in the pressurized line are detected by monitoring the energy required by each of the first heater and the second heater to maintain the first and second heaters at a predetermined elevated temperature. The difference in energy required is proportional to flow rate.

According to another aspect of the invention, a first thermal element monitors the temperature of the first heater and a second thermal element monitors the temperature of the second heater.

According to another aspect of the invention, the difference in power is a difference in integrated power.

These and other objects, features and advantages of the present invention will become apparent from the following specification when read in connection with the accompanying drawings in which:

FIG. 9 is a side view of an alternative embodiment of the line leak detector configured for installation in a pipeline shown in a closed, leak testing position;

FIG. 9a is an end view of the alternative embodiment of FIG. 9; and

FIG. 9b is a side view similar to that of FIG. 9 shown in an open, flow position;

FIG. 10a is a top view of the lower housing of FIG. 10;

FIG. 10b is a cross-sectional view of the lower housing taken along lines 10b—10b in FIG. 10a;

FIG. 11 is a front view of the detection conduit and printed circuit board of a line leak detector incorporating two heaters.

Figure 1:
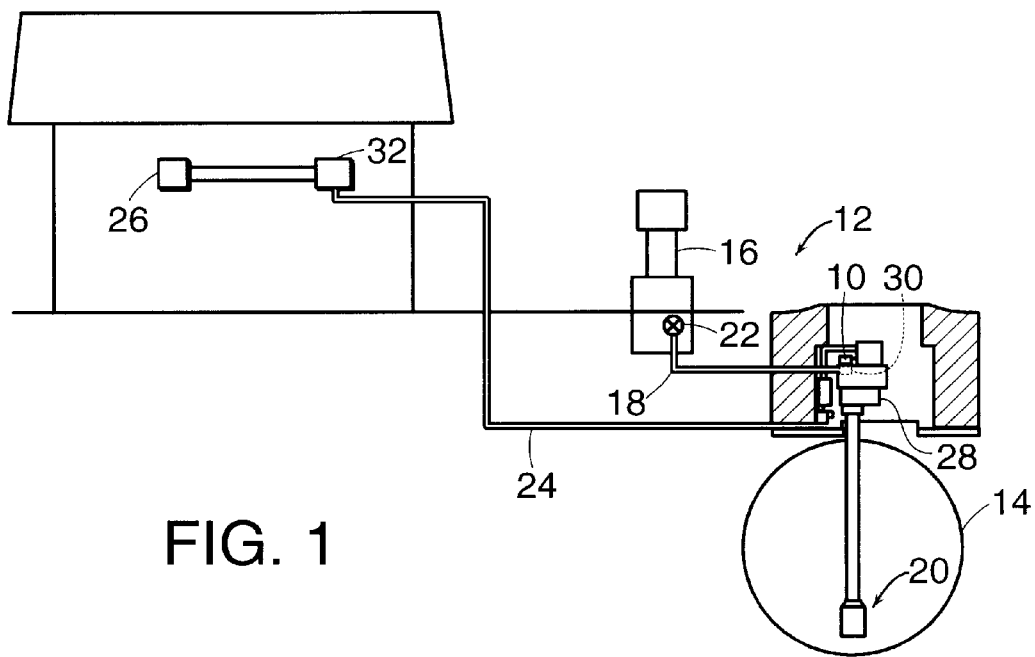
FIG. 1 is a typical fuel delivery system with the line leak detection apparatus of the invention installed.

With reference now to the drawings and more particularly FIG. 1 thereof, there is shown a line leak detector 10 for detecting and measuring a leak in a pressurized liquid pipeline dispensing system 12. Dispensing system 12 includes a storage tank 14 connected to a dispenser 16 via pipeline 18. A submersible pump 20 pumps liquid from tank 14 through pipeline 18 to dispenser 16. A normally closed valve 22 is opened when dispenser 16 is activated. An electrical conduit 24 running from a pump control relay box 26 located in a non-hazardous location provides power to system 12. There are only two lines within conduit 24 with 220 VAC potential between them.

Line-leak detector 10 is located in a line-leak-detection port 30 of a pump manifold 28 associated with submersible pump 20 located externally to tank 14. A microprocessor-based-line-leak-detector controller 32 is in communication with relay box 26. The only field wiring connections for line-leak detector 10 are two wires which are tied in parallel to the power lines in electrical conduit 24, thus power is supplied to both pump 20 and line leak detector 10 over the two lines in conduit 24. Line-leak detector 10 not only receives power over these lines but also transmits leak data to controller 32 over these lines.

Figure 2:
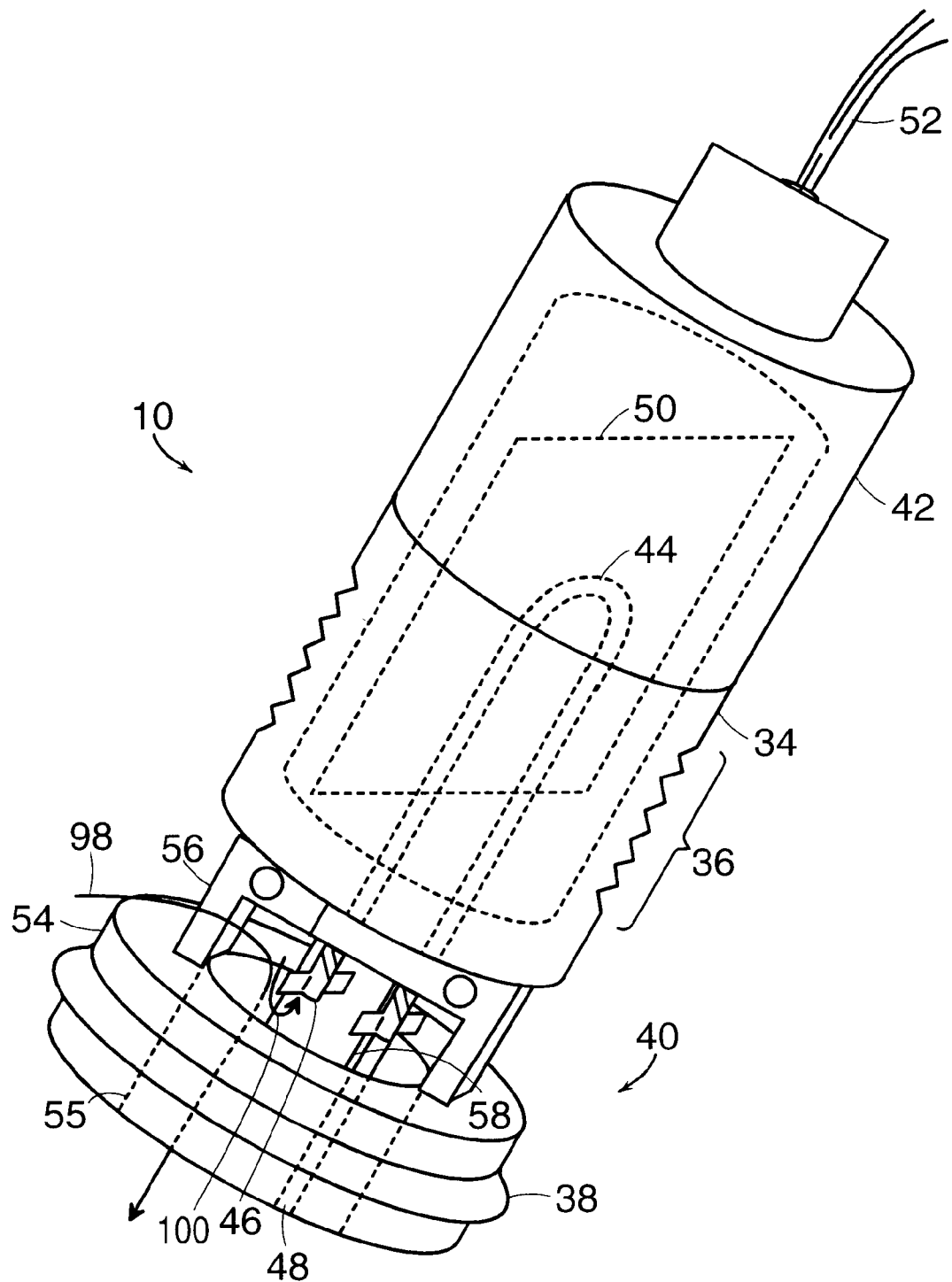
FIG. 2 is a perspective view of the line leak detector of the invention.

Referring to FIG. 2, line-leak detector 10 includes a housing 34 with a threaded portion 36 which mechanically screws into port 30 of pump manifold 28. A rubber o-ring 38 creates a seal against port 30 forcing all of the liquid from the submersible pump to flow through line-leak detector 10 before it enters pipeline 18. A lower housing 40 is mounted to one end of housing 34 and an upper housing 42 is mounted at the opposite end of housing 34. A detection conduit 44 formed in a u-shaped tube having a first leg 46 shorter than a second leg 48 defines a detection flow path through line-leak detector 10. Line-leak detector 10 includes a printed circuit board 50 and wires 52 connected in parallel with the power lines in conduit 24.

Figure 2A:
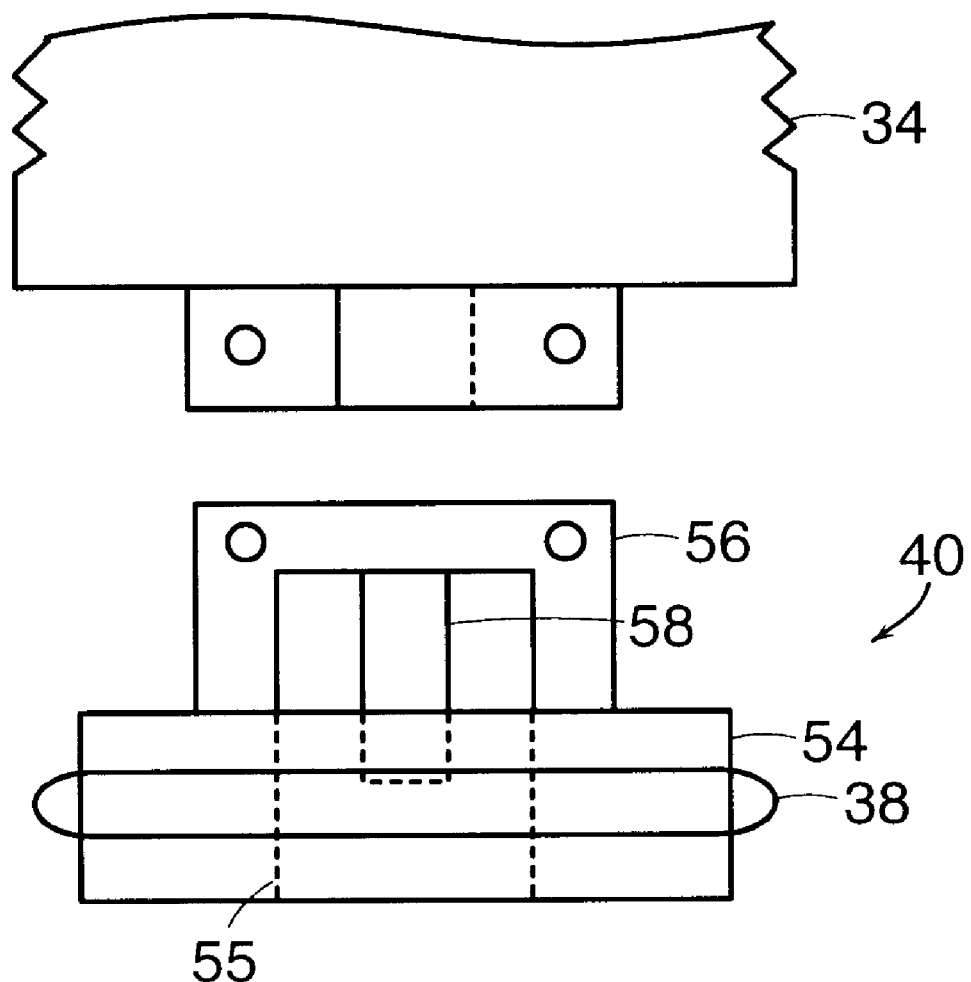
FIG. 2a is an exploded side view of a portion of the line leak detector.

Referring to FIG. 2a, lower housing 40 includes a ring 54 on which o-ring 38 is mounted. Ring 54 defines a central bore 55. A bridge 56 may be machined integrally with ring 54 and includes a tube 58 containing a spring loaded shaft (described below). Bridge 56 mounts lower housing 40 to housing 34.

Figure 3:
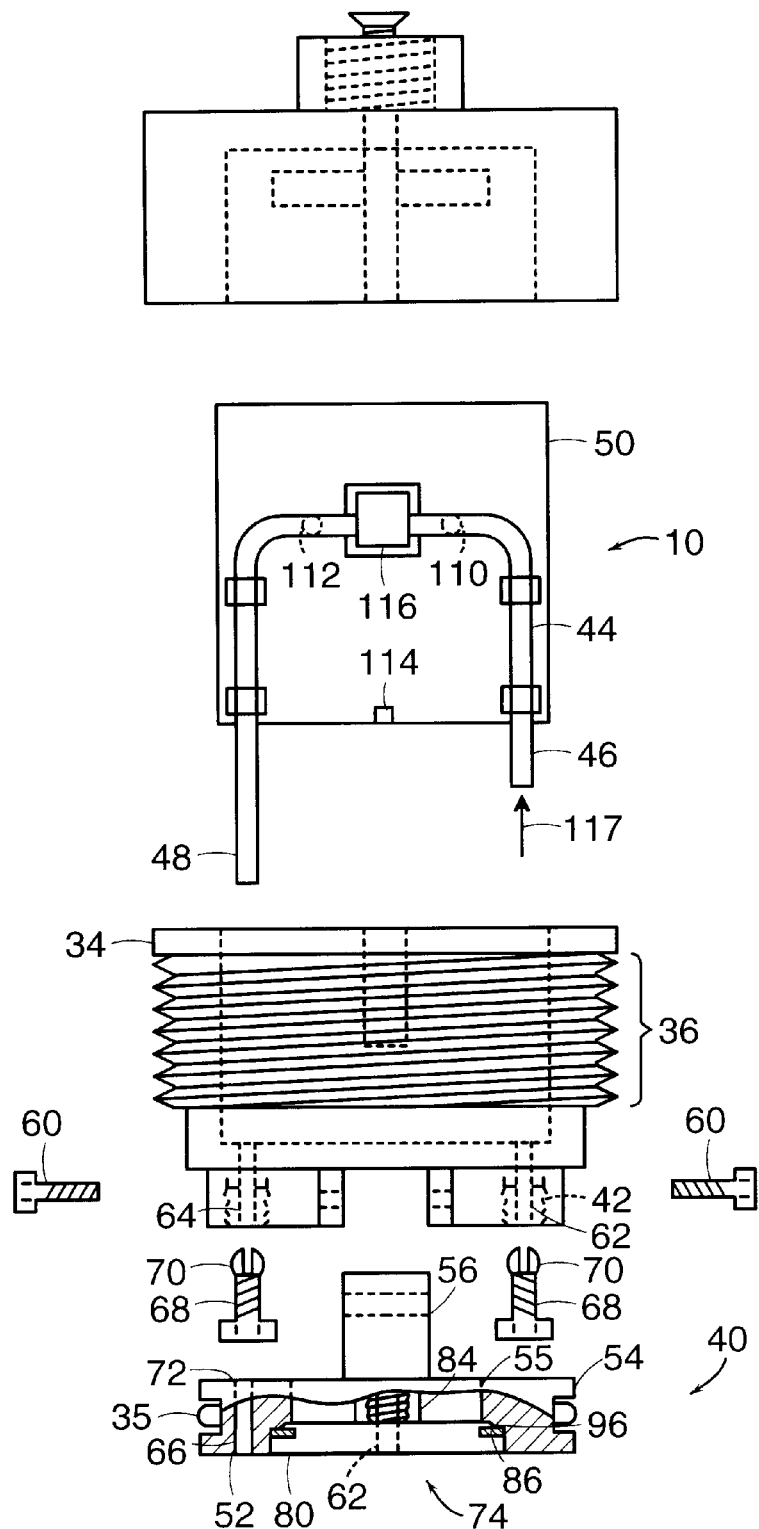
FIG. 3 is a partially cut-away, exploded side view of the line leak detector, rotated 90° with respect to FIG. 2a, and shown in a retracted, leak testing position.

Referring to FIG. 3, lower housing 40 is mounted to housing 34 via screws 60. Detection conduit 44 sits within housing 34 with first leg 46 passing through a channel 62 defined by housing 34 and second leg 48 passing through a channel 64 defined by housing 34 and a channel 66 defined by ring 54. Screws 68 with ferrules 70 hold detection conduit 44 in place. In the area 72 where second leg 48 of detection conduit 44 enters channel 66, retaining compound may be used to insure a leak-proof seal. Lower housing 40 includes a deflector assembly 74.

Figure 4:
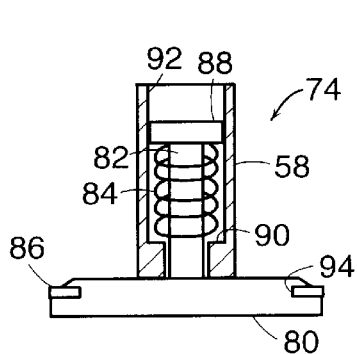
FIG. 4 is a side view of the deflector assembly of the invention showing the deflector assembly in the retracted position.
Figure 4A:
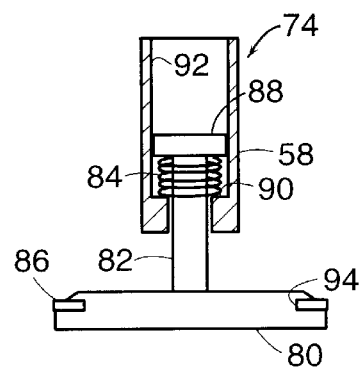
FIG. 4a is a side view of the deflector assembly showing the deflector assembly in an extended position.

Referring to FIGS. 4 and 4a, deflector assembly 74 includes a deflector plate 80, a spring loaded shaft 82 housed within tube 58, a spring 84 and an o-ring 86. Spring 84 is captured between a head 88 of shaft 82 and a lip 90 defined by an inner wall 92 of tube 58. Deflector plate 80 includes a circumferential groove 94 in which o-ring 86 is located.

Under a no- or low-flow condition, e.g., below 5 GPH, deflector plate 80 is in the retracted position of FIG. 4, with o-ring 86 forming a seal against an inner wall 96 of housing 34 (see FIG. 3), preventing any flow through bore 55. Any flow below 5 GPH occurs only through detection conduit 44. The small diameter, e.g., 0.097 I.D., of detection conduit 44 permits the measurement of very small flow rates, e.g., less than 0.05 GPH, by detection methods described below. Under pressure due to flow, e.g., above 5 GPH, deflector plate 80 is pushed to the position of FIG. 4a, allowing flow through bore 55. Spring 84 biases deflector plate 80 toward the retracted position of FIG. 4.

Figure 5:
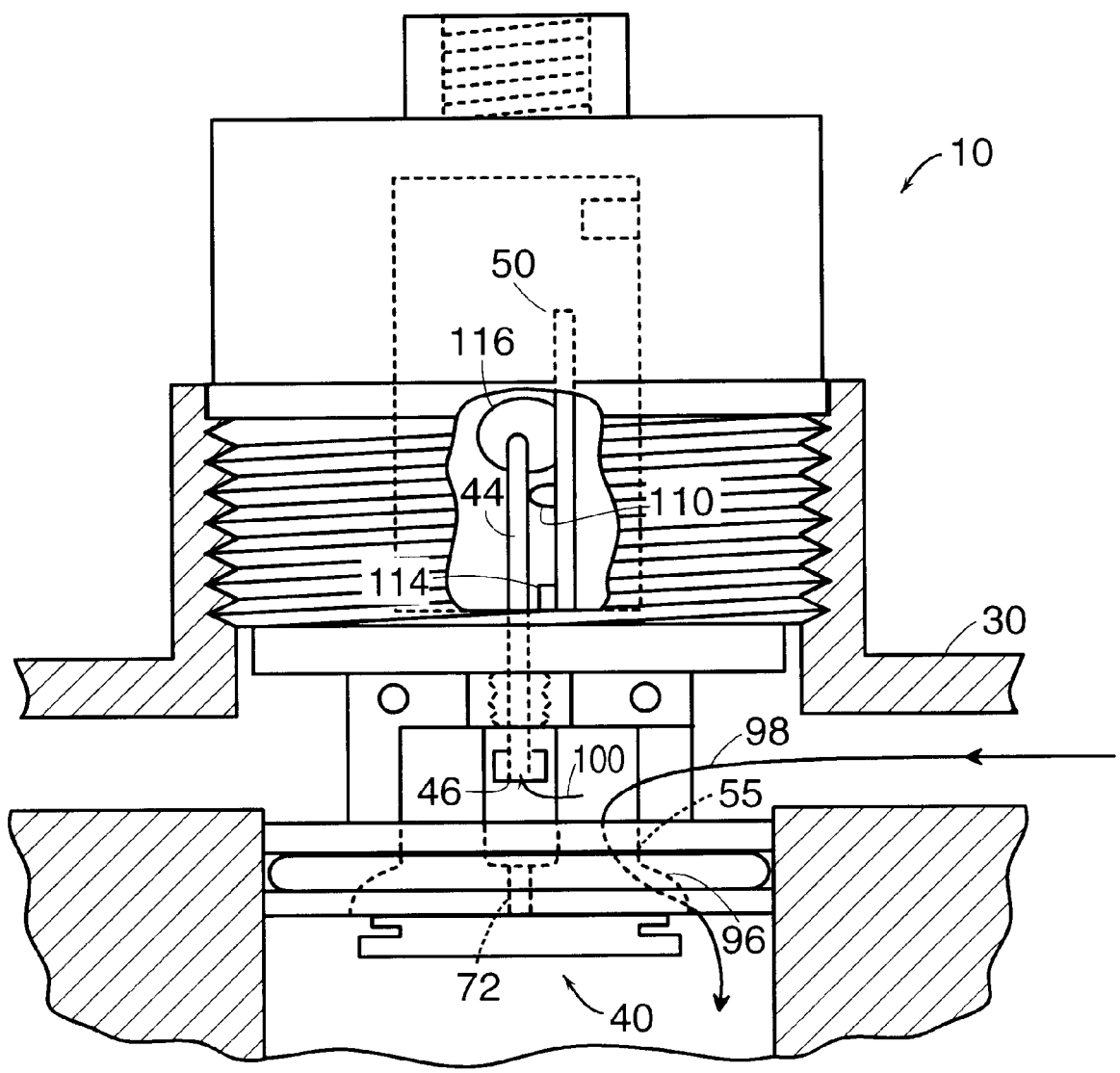
FIG. 5 is a side view of the line leak detector of the invention shown mounted in a detection port and in an extended, flow position.

Referring to FIGS. 2, 3 and 5, during liquid dispensing through pipeline 18, liquid entering line-leak detector 10 flows through both a delivery flow path and the detection flow path. Turning first to the delivery flow path, fluid enters central bore 55 along arrow 98. Flow into bore 55 above 5 GPH causes spring loaded shaft 82 to move from the retracted, flow preventing position of FIG. 3 to the extended, flow position of FIG. 5. Liquid flowing out bore 55 enters pipeline 18.

Turning now to the detection flow path. Liquid flowing into the region of bore 55 also flows into first leg 46 of detection conduit 44 along arrow 100. Liquid flowing out second leg 48 of detection conduit 44 enters pipeline 18.

Figure 10:
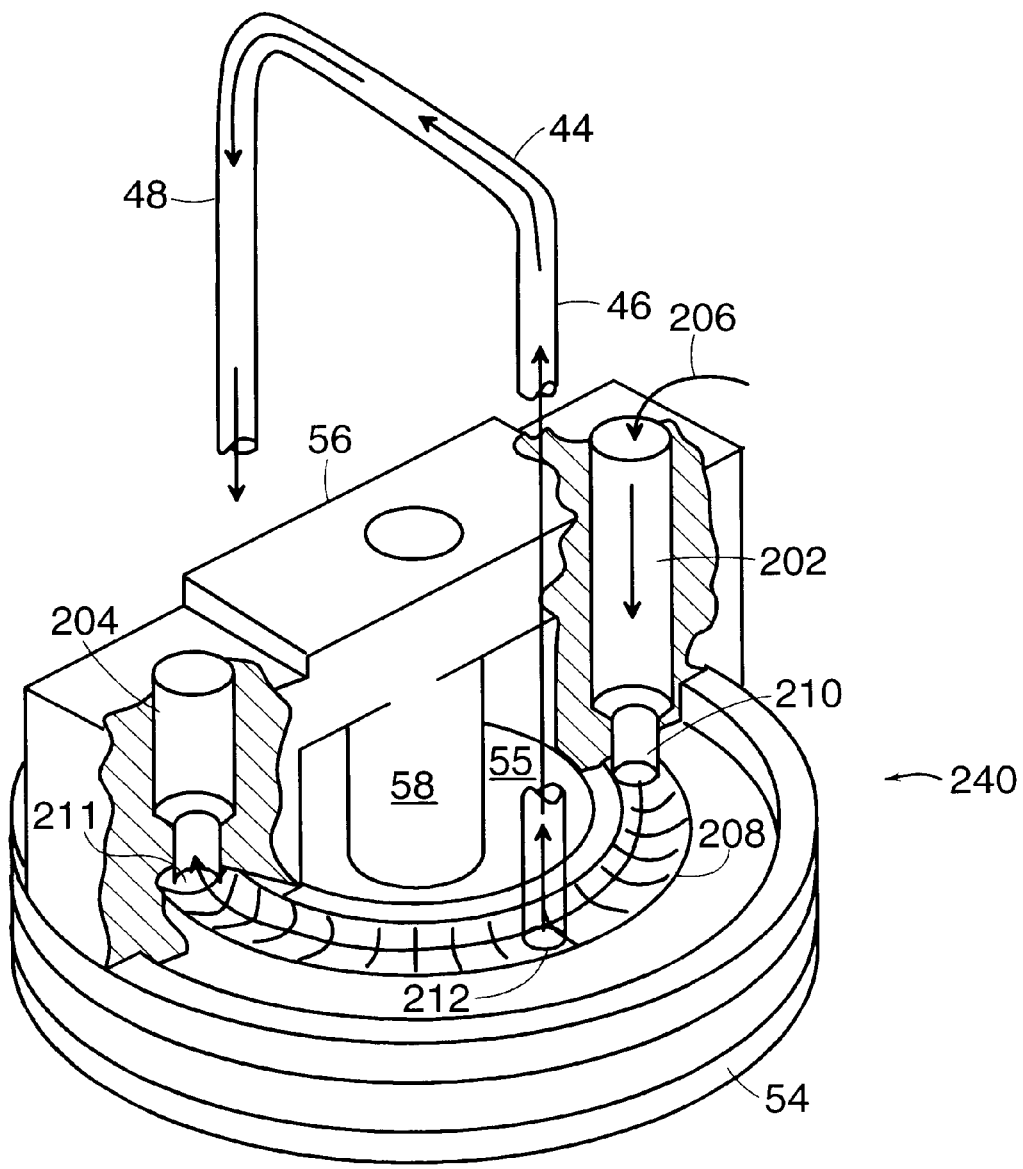
FIG. 10 is an illustration of an alternative embodiment of the lower housing of the line leak detector of FIG. 2.
Figure 12:
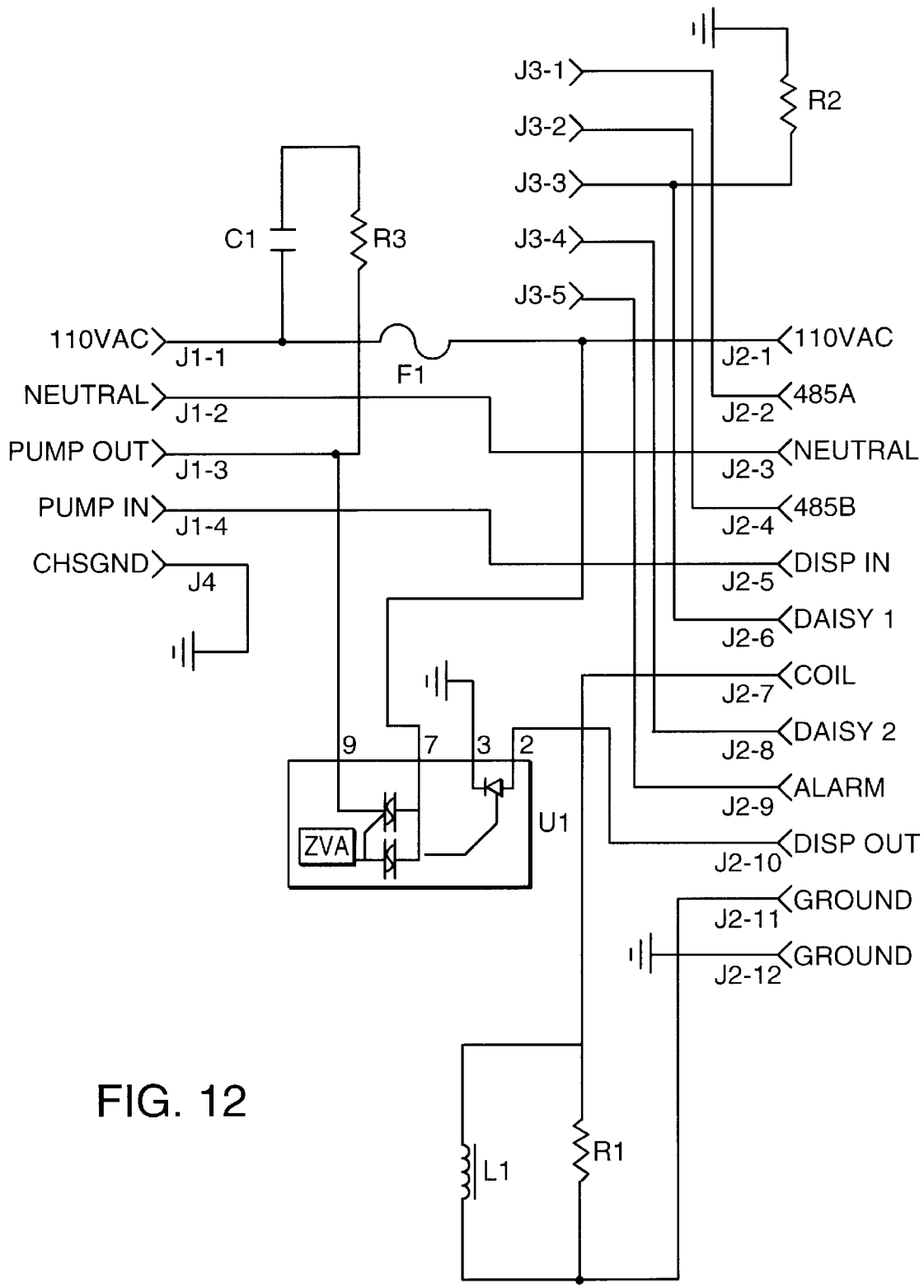
FIG. 12 is a schematic diagram of a termination board of the system controller.
Figure 12A:
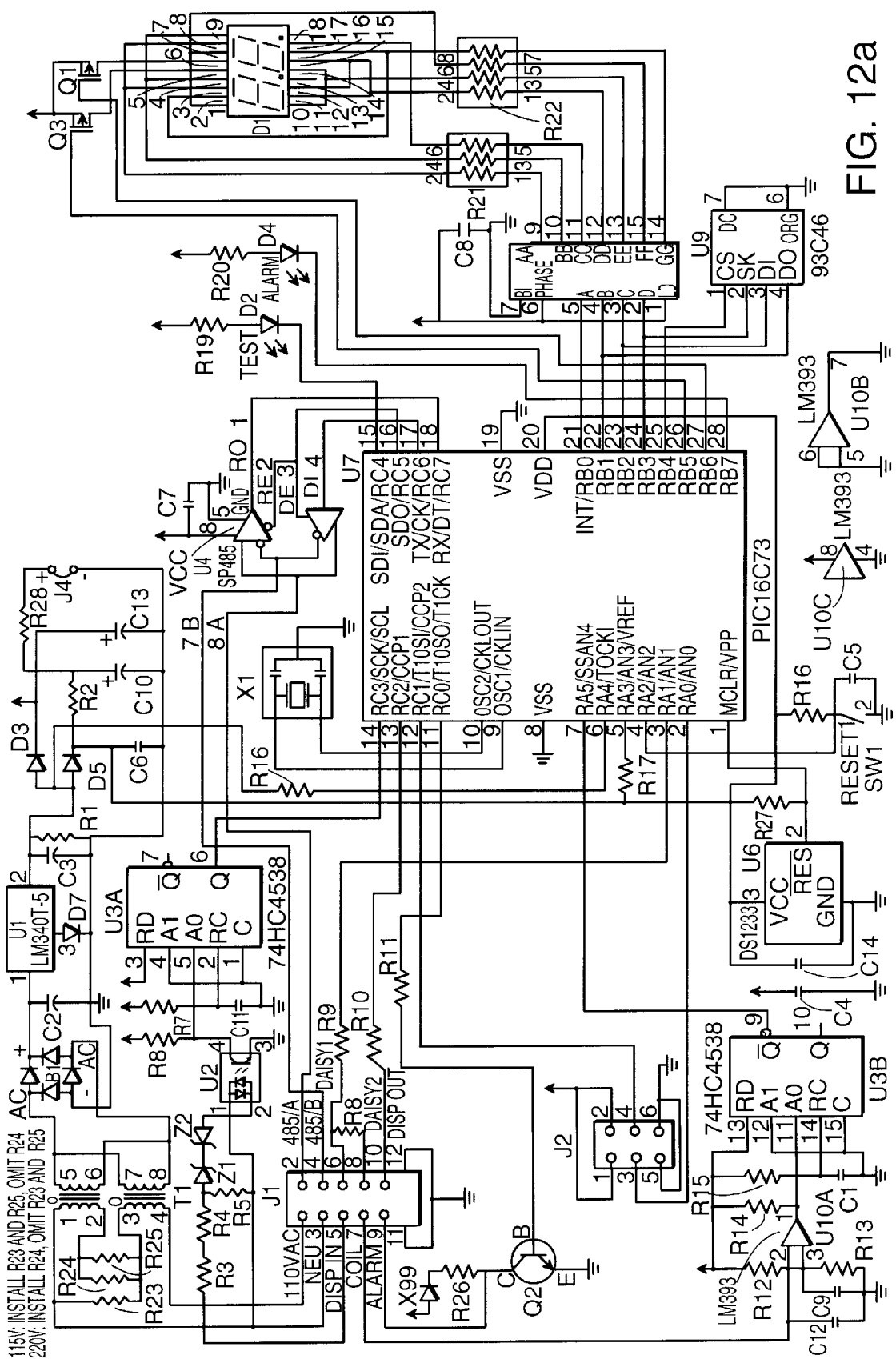
FIG. 12a is a schematic diagram of a control board of the system controller.
Figure 12B:
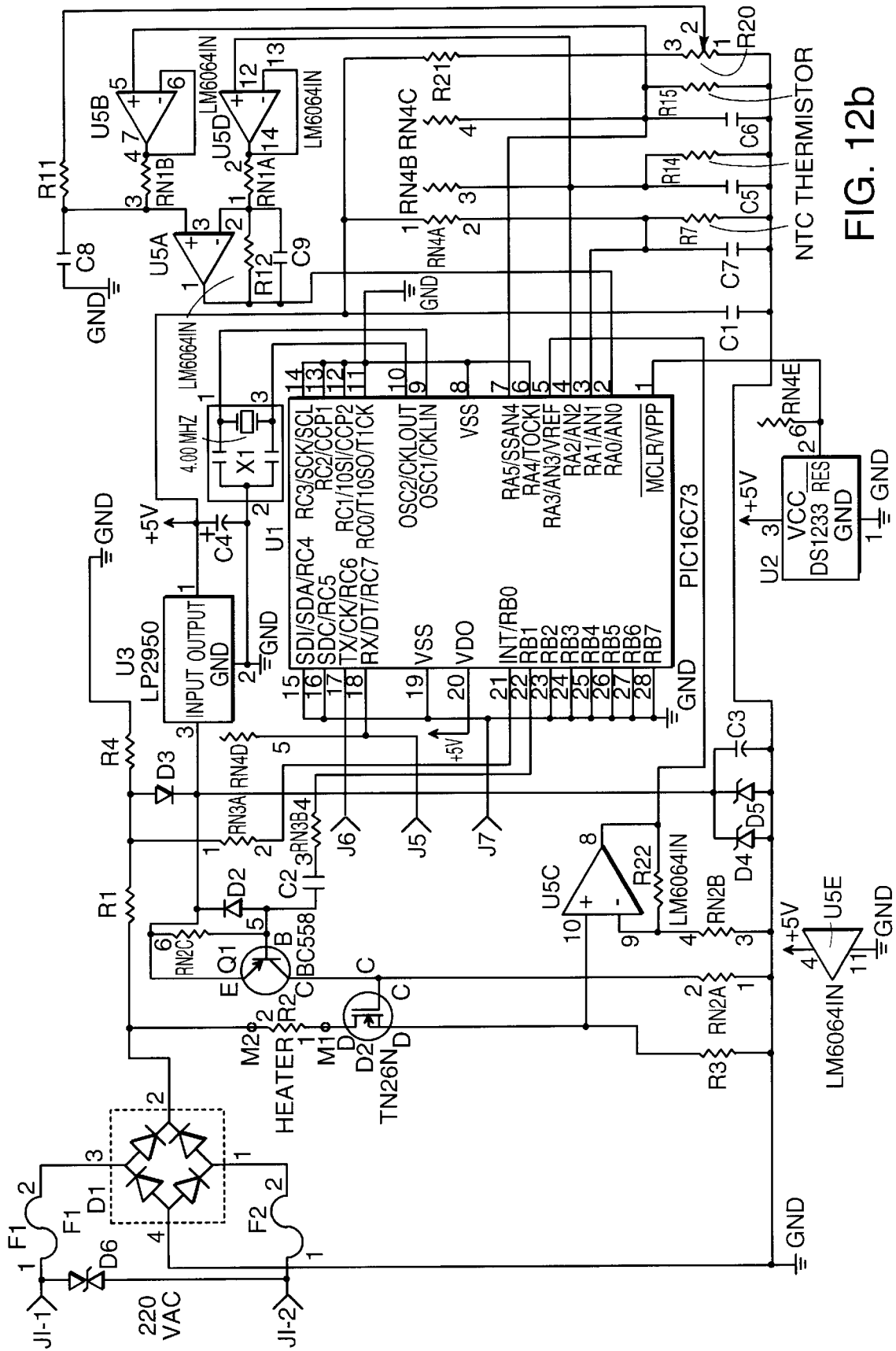
FIG. 12b is a schematic diagram of a line leak detector board.

Referring to FIGS. 10 and 10a, in an alternative embodiment, a lower housing 240 of line leak detector 10 includes a stabilizing assembly, e.g., a check valve 202, and a relief valve 204 located in the path of the fluid entering detection conduit 44. Check valve 202 acts to stabilize a fluid oscillating effect that occurs in some submersible pumps to avoid erroneous measurements of fluid flow. Fluid flowing through check valve 202 (which is forward biased at, for example, about 2 psi) along arrow 206 enters a chamber 208 in lower housing 240 through a port 210. A port 212 receives the first leg 46 of detection conduit 44 placing the detection conduit in fluid communication with chamber 208. Through hole 214 receives the second leg 48 of detection conduit 44. Relief valve 204 (which is reverse biased at, for example, 15 psi) is in fluid communication with chamber 208 and allows fluid to flow back towards the storage tank as a safety precaution when a predetermined pressure is reached, such as caused by thermally expanding fuel in an idle system. Fluid flowing in the delivery flow path enters central bore 55 of lower housing 240 along arrow 220. Lower housing 240 otherwise operates as described above with reference to lower housing 40.

Referring to FIGS. 3 and 5, line-leak detector 10 includes two thermal elements 110, 112 and a third reference thermal element 114. Each thermal element may be a thermistor, an RTD, a semiconductor temperature sensor or any other electronic means of measuring temperature.

Fluid flow can be detected using the thermal properties associated with the semiconductor material of the thermal elements. One thermal property that can be used is the power dissipation constant. The power dissipation constant is defined as the ratio, at a specified ambient temperature, of the power dissipated in a thermal element to the resultant change in its body temperature. The temperature change in a thermal element, due to dissipated power, depends on the rate at which the heat is transferred away. The heat transfer rate is affected by several factors, such as the device geometry, the surrounding medium, and the movement of fluid past the device. The preferred thermal property used is the resistance/temperature characteristics. Here, the thermal element is used as a thermometer, reporting the temperature sensed as a change in resistance.

Line-leak detector 10 utilizes the movement of heated fluid past thermal elements 110 and 112 for the detection and measurement of the liquid movement. Thermal element 114 is used to provide a reference temperature corresponding to the temperature of the fluid in pipeline 18.

Thermal elements 110 and 112 are mounted to circuit board 50 and are in contact with detection conduit 44. They are evenly spaced on either side of a temperature controller, e.g., heater 116 formed from a ceramic bobbin wound with nichrome wire. Thermal element 114 is mounted to circuit board 50 and is in contact with housing 34. During a leak test (as described below), heater 116 is turned on to heat detection conduit 44 to a desired temperature. The reference temperature indicated by thermal element 114 is used to determine the desired temperature, e.g., 50° F. above the reference temperature. Alternatively, instead of employing thermal element 114, the reference temperature may be derived at the beginning of the test by measuring thermal elements 110, 112 before applying heat.

As detection conduit 44 is heated, the heat transfers down conduit 44 in both directions toward thermal elements 110, 112. If the fluid in detection conduit 44 is not moving, the heat transfer rate will be the same in both directions and thermal elements 110, 112 indicate the same temperature. If there is flow in detection conduit 44 along arrow 117, thermal element 110, upstream of heater 116, indicates a lower temperature than it would under no flow conditions and thermal element 112, downstream of heater 116, indicates a higher temperature than it would under no flow conditions. If the flow is in the opposite direction, the temperature of element 110 will be higher than the temperature of element 112.

Temperature data received from thermal elements 110, 112 is conveyed to controller 32, as described below, to determine if there is a leak greater than the rate of the current leak test, i.e., 0.1 GPH test, 0.2 GPH test or 3 GPH test. In general, the greater the difference between the temperatures indicated by the thermal elements, the greater the flow through the tube, thus the greater the leak.

To perform a leak test, controller 32 waits for a "quiet time" (no dispensing) of the liquid dispensing system. The "quiet time" may be determined by monitoring electrical signals from associated equipment, e.g., dispenser 16, a pump handle lever, or a console or cash register operated by an attendant. After a predetermined "quiet time" has elapsed, discussed below, controller 32 energizes pump 20, and with dispenser valve 22 closed, pipeline 18 is filled and brought up to full operating pressure. Pump 20 remains energized during the line leak test to keep the line at full operating pressure even if a leak is present. After pipeline 18 is at operating pressure, if any flow due to a leak is less than 5 GPH, the lack of significant flow will cause deflector plate 60 to close and any flow passes through the detection flow path. If the flow is above 5 GPH, deflector plate 80 moves to its extended position and there is flow through both the delivery flow path and the detection flow path.

Any leak in the pressurized line is detected and quantified, as described below. Upon recognition of a leak higher than the allowed limit, controller 32 automatically shuts off the submersible pump and sounds an alarm.

The line-leak system automatically performs a 3 GPH line leak test after every fuel dispense. The test is activated when the dispenser has been shutdown and the pump has been turned off. If no 3 GPH leaks exist, the control unit will perform a 0.2 GPH test. The dispensing system must be in a "quiet state" for a predetermined time dependent on the thermal conditions of the pipeline for a successful 0.2 GPH test to be performed. The predetermined time can range from 3 minutes to 8 hours dependant on the temperature difference between the fluid and ground, the greater the temperature difference the longer the time. Once the 0.2 GPH test is passed, no further 0.2 GPH tests will be performed for 24 hours. The annual 0.1 GPH test is manually activated by pressing the reset/test button for approximately 5 seconds. A quiet time of about 8 hours should occur before this test is performed.

Figure 6:
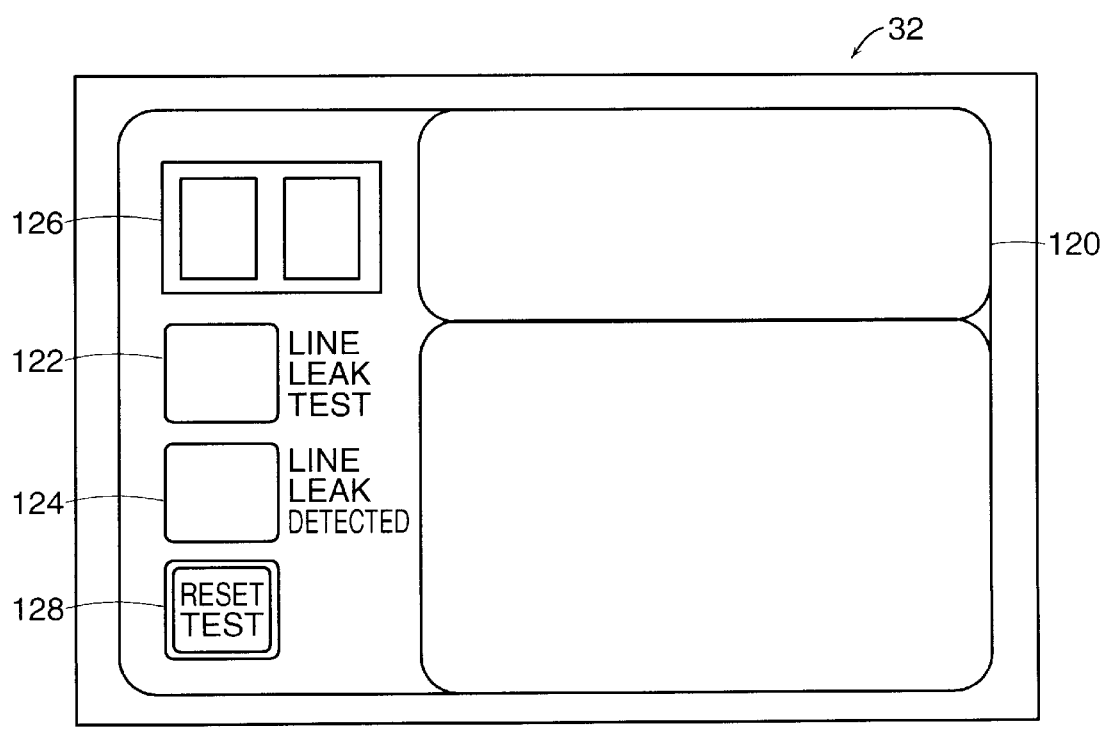
FIG. 6 is an illustration of the front panel of a system controller.

Turning now to controller 32 and FIG. 6, a front panel 120 includes a line-leak-test LED 122 and a line-leak-detected LED 124. LED 122 turns on every time the system is doing a line leak test. LED 124 illuminates when a line leak is detected and can be cleared by a successful leak test.

During normal operation, if there is not sufficient "quiet time" to perform a 0.2 GPH test in a 24 hour interval, the two digit display indicates the number of days since a successful test was performed. If this condition exists for more than 30 days, an alarm is activated. If a line leak is detected, the two digit display indicates which leak test failed. If a system failure or problem is detected, display 126 shows a code that indicates what the problem is. When a leak has been detected and the system has gone into alarm, a reset/test button 128 shuts off the alarm and retests the system while LED 124 remains illuminated. The alarm will reappear if the existing fault is not eliminated. Pressing the reset/test button 128 when the system is not in an alarm state starts a system check, this test checks the line leak system itself to verify that the circuits are functional and the LED's are working. Pressing reset/test button 128 for approximately 5 seconds starts a 0.1 GPH line leak test.

Figure 7:
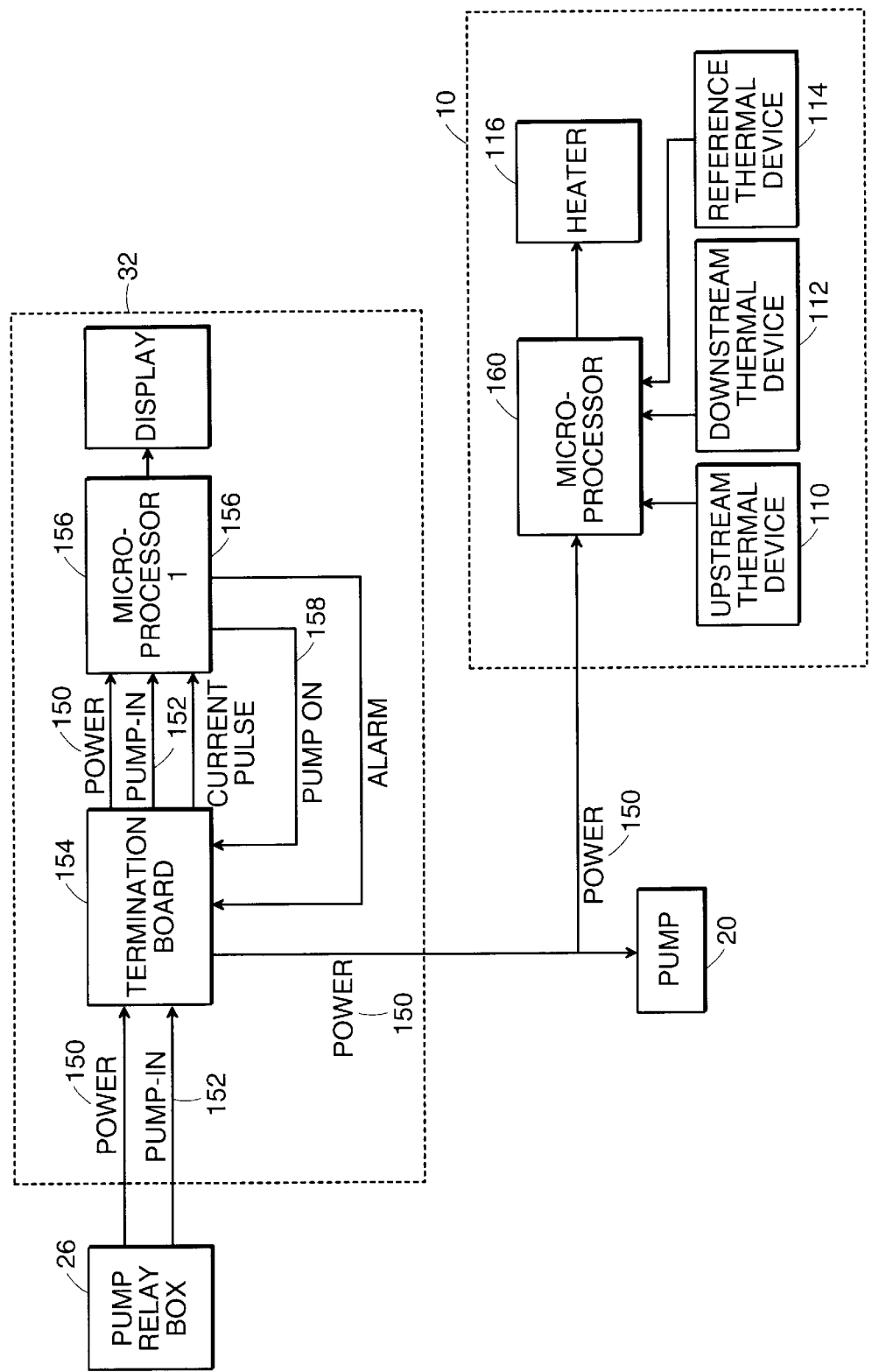
FIG. 7 is a block diagram of the communication scheme of the line leak detection apparatus.

Turning now to the method of communication between line-leak detector 10 and controller 32. Referring to FIG. 7, as described above, leak detector 10 is electrically tied directly, in parallel, to the existing power wires connected to the submersible pump 20, thus receiving power from these wires. Controller 32 is tied directly to pump relay box 26, thus receiving power from this box. All communication takes place over the existing power wires.

Power 150 and "pump-in" signal 152 are fed to a termination board 154 in controller 32. Signal 152 indicates when the pump lever on the gas pump has been raised. Power 150 and pump-in signal 152 are then fed to a microprocessor 156. If the pump-in signal is on, microprocessor 156 sends a pump-on signal 158 to termination board 154 instructing termination board 154 to supply power 150 to pump 20 while pump relay box 26 sends a signal to dispenser 16 to open valve 22. Gasoline is then dispensed.

If pump-in signal 152 is off and it is time to perform a leak test, pump-on signal 158 is sent to termination board 154 supplying power to pump 20 to pressurize the line. Whenever power is supplied to pump 20 it is also supplied to line-leak detector 10.

Heater 116 in line-leak detector 10, under the control of a microprocessor 160, is turned on to heat detection conduit 44 to a temperature, e.g., 50° F., higher than the reference temperature of housing 34. Feedback from downstream thermal element 112 and from reference thermal element 114 is used by the microprocessor to control the heater. (Alternatively, feedback from upstream thermal element 110 can be used to indicate the temperature of detection conduit 44, or the average of the temperatures detected by the upstream and downstream thermal elements can be used to indicate the temperature of detection conduit 44.) Once the desired temperature differential between detection conduit 44 and housing 34 is reached, heater 116 is turned on and off as needed to maintain the temperature differential.

A pulse width modulated current signal is sent to heater 116 at a fixed frequency rate, e.g., 240 times a second. When heat is required, microprocessor 160 sends a wide pulse, e.g., 125 microseconds. When no heat is required, the pulse width or on time is reduces to a minimal value, e.g., 4–8 microseconds. The pulse width, or on time, is varied as required to maintain the heater at the desired temperature.

At the same time the temperature differential between downstream thermal elements 112 and reference thermal element 114 is being maintained, a second temperature differential corresponding to the difference in temperature between the upstream thermal element 110 and downstream thermal element 112 is measured. It is this second temperature differential that is related to leak rate.

Figure 8:
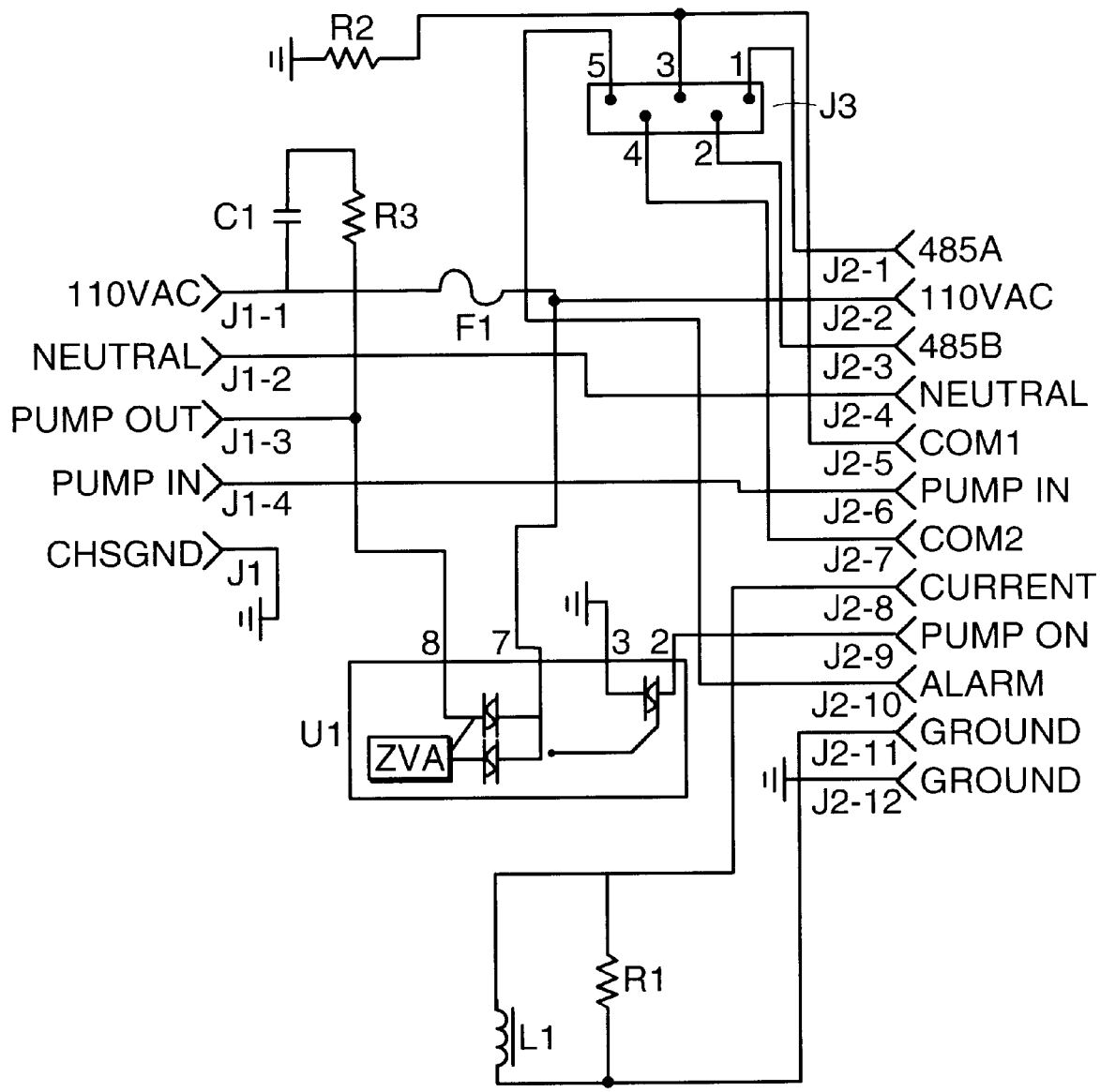
FIG. 8 is a schematic diagram of a termination board of the system controller.
Figure 8A:
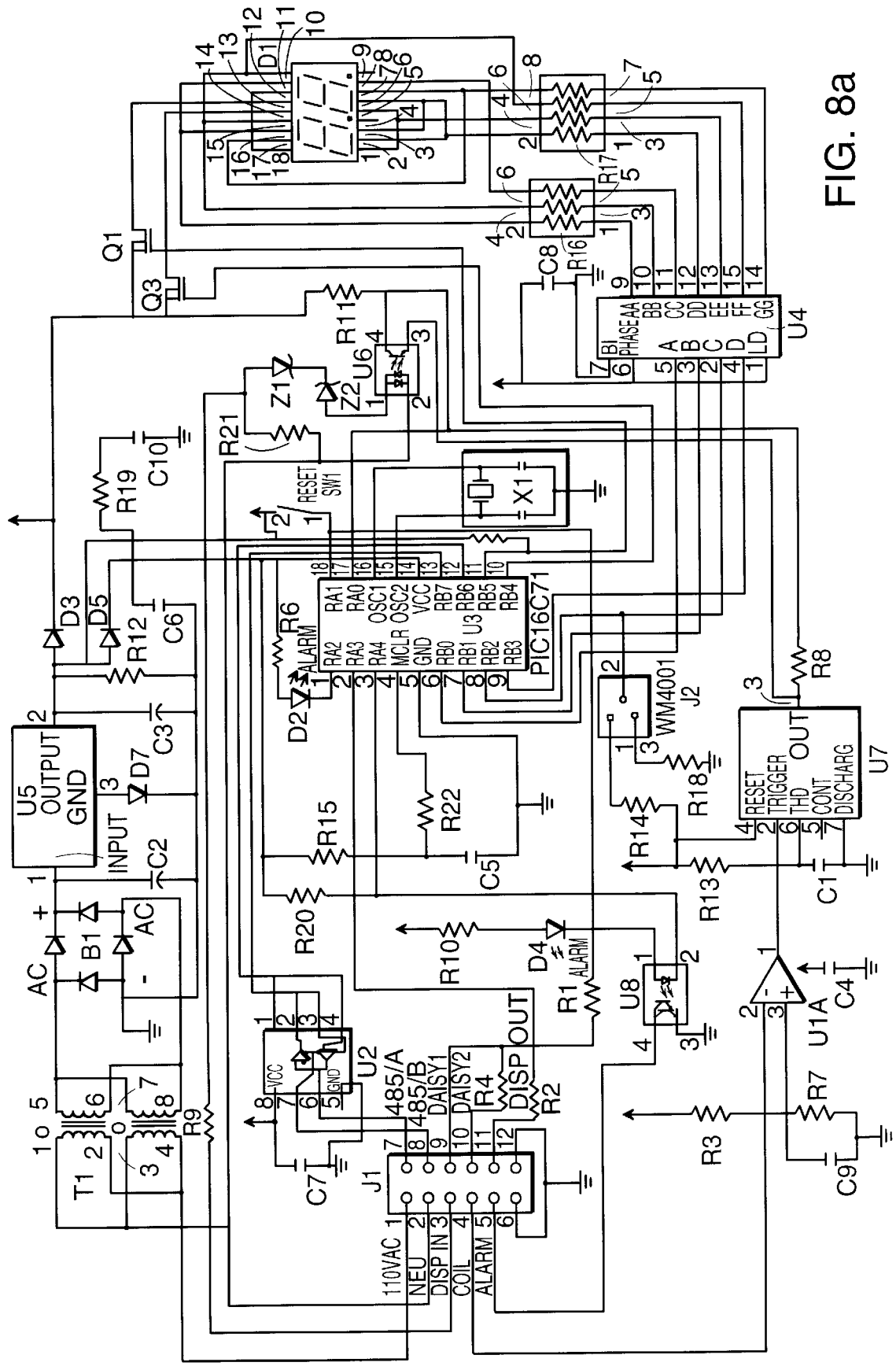
FIG. 8a is a schematic diagram of a control board of the system controller.

The current pulses drawn by the heater are also used to communicate the leak detection data from line leak detector 10 to controller 32. Heater 116 draws a relatively large current so the pulses of heater current drawn from the power wiring can be detected, as described below. Data is encoded in the current pulses streams by inserting gaps, i.e. periods with no pulses of any width, in the streams of current pulses. Normally, a gap is inserted between every 255 pulses. To communicate leak rate information to controller 32, microprocessor 160 inserts an extra gap between consecutive pulses. The number of pulses between the last gap, i.e., the gap inserted every 255 pulses, and the extra gap is related to the second temperature differential. A current transformer coil (see L1 in FIG. 8) within the termination board 154 senses and relays the current pulses to microprocessor 156. Microprocessor 156 is able to count the number of current pulses, as described further below. As each gap in the current pulses is reached, the controller analyzes the number of counts since the last gap. If the number of counts does not equal 255 counts, controller 32 knows that this counting contains the leak data sent by line leak detector 10. For example, if the number of counts is 64 there is no leak. For a 0.1 GPH test, if the number of counts is greater than 80 there is a leak. For a 0.2 GPH test if the number of counts is greater than 100 there is a leak. Count numbers from 0 to 64 indicate that the fluid flowed back into the pump as a result of thermal expansion of the liquid.

Figure 8B:
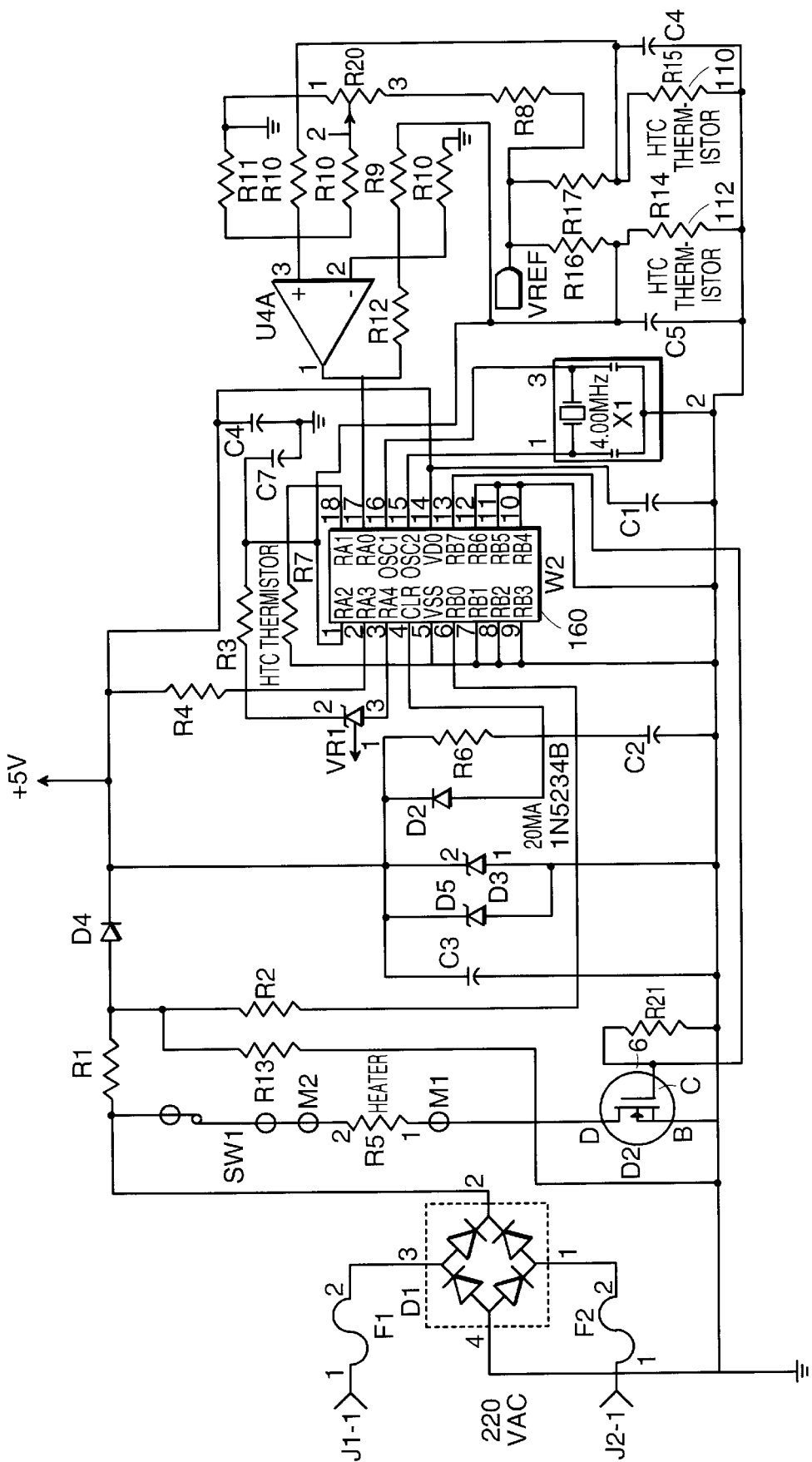
FIG. 8b is a schematic diagram of a line leak detector board.

Referring to the electrical schematic of FIG. 8b, the circuitry associated with thermal elements 110, 112 sends a count to microprocessor 160 which is related to the temperature differential between the elements. It is this count that is used to determine the placement of the extra gap.

During the annual 0.1 GPH leak test, microprocessor 160 is continuously collecting data related to the temperature differential between the upstream and downstream sides of detection conduit 44 for a predetermined test run length, e.g. thirteen minutes. Over this length of time, e.g., 32,000 sample data points are gathered. The sample data points are averaged and a gap corresponding to the count of the average data point is inserted into the current pulses to the heater.

For the 0.2 GPH leak test, the test is initially run as described for the 0.1 GPH leak test. Since this test is run soon after gas dispensing and there may still be thermal activity in the fluid, the system then pauses for a predetermined time, e.g., 7 minutes, and runs the test again; repeats the pause and runs the test again. The three counts are compared by microprocessor 156 for consistency. If the counts are not consistent, the fluid is expanding or contracting due to temperature changes. In this case the system waits for adequate temperature stability to be reached by repeating the series of tests until three counts are consistent. Alternatively, microprocessor 156 can make a prediction of the settling point of the exponential thermal decay to determine the steady state flow without waiting for complete thermal stability.

For the 3 GPH leak test, microprocessor 160 turns the heater on. If the temperature of the detection conduit does not reach a predetermined temperature, e.g., 50° F. above the housing temperature, within a predetermined period, e.g., 2 minutes, microprocessor 160 sends a count of 254 to controller 32 indicating that the leak rate exceeds 3 GPH. In general, large flow rates can be determined by applying constant power to heater 116 and measuring the time to reach a predetermined temperature. If a flow condition above established thresholds is detected, the 3 GPH test will be repeated before reporting an alarm condition. This repetition allows compliant portions of the system, such as flexible piping, to reach equilibrium, thus more accurately attributing measured flow to that caused by an actual leak.

The relationship between the counts and the leak rate can be experimentally or theoretically determined.

Microprocessor 156 of controller 32 is able to count the current pulses sent to heater 116 by microprocessor 160 because a current spike is created in the 220 VAC line every time heater 116 receives a current pulse. Microprocessor 160 turns on the heater via a mosfet. Because the mosfet is a very fast device (turn-on time in the low nanoseconds), the current in the heater reaches full value very quickly, creating a current spike on the 220 VAC line.

The critical portion of the communication is the slope of the on-time and off-time of the current spikes. Even though the current to the pump is much greater than the value of the current spikes, the rise and fall time of the pump current is much slower than the current spikes. The induced voltage into the current transforming coil, L1, is governed by di/dt. The current change in the 220 VAC wire due to the current spikes is about 1 ampere in about a few nanoseconds, and the current change in the 220 VAC wire due to the pump is about 5–10 amperes, but in a few milliseconds. The induced voltage due to the current spikes is therefore several thousand times greater than that due to the pump current. Thus the control unit can separate the communication pulses from the pump current and noise.

FIGS. 8–8b and FIGS. 12–12b are schematic circuit diagrams of two exemplary embodiments used in the invention with specific parameter values listed. Those skilled in the art will be able to practice the invention by building these circuits.

Line leak detector 10 includes a self-check routine to determine if detection conduit 44 is blocked or obstructed. If during several leak tests, the power required by the heater to maintain an elevated temperature is below a threshold, the unit will alarm that its sensing tube is blocked and thus fail in a safe manner.

Other embodiments are within the following claims.

For example, the pulse of electrical energy sent to the heater can be time modulated on a line cycle to line cycle basis to compensate for variations in power line voltage. The current through heater 116, and thus the line voltage is monitored by the microprocessor. This information may be used to control the appropriate duration of the pulse of electrical energy, during each power line cycle, to deliver constant power to the heater. The microprocessor maintains detection conduit 44 at a predetermined temperature above that measured by thermal element 114, by allowing and rejecting these pulses if detection conduit 44 is below and above, respectively, the predetermined temperature. A hysteresis band may also be used.

Instead of using only the differential measurement of thermal elements 110, 112 to indicate the direction and magnitude of fluid flow, the power dissipated by the heater to maintain the elevated temperature of detection conduit 44 can also be employed. This power may be determined by summing or integrating the constant power pulses sent to heater 116. The amount of power required is proportional to flow. The differential measurement of thermal elements 110, 112 and the measured required power are processed to correct for their non-linear proportionality to flow. The leak test result is now based on two distinct and different thresholds, one correlated to the differential thermal measurement, the other, to the power measurement. Both thresholds must be exceeded to signify a leak condition. A multidimensional correction interprets both the differential thermal measurement and the power measurement and develops a linearized single result representing the magnitude and direction of flow.

Second order control methods, such as proportional-integral-derivative control, can also be used to control heater 116. This method maintains constant heater temperature, independent of flow, and allows monitoring of the power dissipated by the heater as a direct real-time representation of flow.

The current pulses which are used to communicate between line leak detector 10 and the control unit can be in the form of serialized digital data with error checking, as opposed to simply counting the number of pulses, as described previously. The temperature differential between thermal elements 110, 112 is represented in digital form. To encode the information on the AC power line, electrical current pulses of approximately 1 Amp are transmitted either once or twice every half cycle of the alternating power line by super-imposing the current pulses on the power line wires feeding the pump motor. Because it is a quick pulse with fast rise and fall times, the rate of change of current and, therefore, the induced voltage is very large and easily detectable and distinguishable from the steady state current of the pump motor.

Each half cycle of the alternating power line includes at least one communication pulse. The first pulse is generated by the high current drawn by the heater. The first pulse is of a short time duration (approximately 5 usec) if the heater control loop is not calling for heat such that the communication pulse is generated, but no significant heat is applied by the heater. The first pulse is of a wide duration (approximately 200 usec) if heat is being applied by the heater. A second communication pulse contains the bits of digital information representing the temperature difference between thermal elements 110, 112. The second pulse is present and absent, respectively, if the represented digital bit is one and zero, respectively. The second pulse, if present, is always of short duration. The first and second pulses occur approximately 40 and 140 degrees after the line voltage zero crossing, respectively.

For error checking, each bit is successively transmitted as three redundant half cycles of the power line. A toroid style pickup coil in the control unit converts this current to a voltage which is detected by a thresholding circuit and fed to the microprocessor. Microprocessor 156 receives the three successive transmissions and searches for a dominant bit pattern. Thus if all three signals are a one, or two of the three signals are a one, the bit is considered a one. If two of the three signals are a zero, or all three signals are zero, the bit is considered a zero. The manner of interpreting the redundant transmissions corrects error caused by intermittent power line disturbances, such as an appliance being turned on or off.

The pulses are generated by the turn-on timing of the heater which serves as a low impedance load to generate the communication current pulses. Each numeric value from the line leak detector is sent with its least significant bit first. A data file comprises three numeric values followed by an exclusive-or checksum. If the receiving device's calculated checksum does not match the received checksum, then that entire data field is discarded.

In further embodiments, only two thermal elements may be employed. After the pipeline has been pressurized, a heater is turned on until the thermal element on the detection conduit reaches a desired temperature above (or below) the ambient temperature of the surrounding fluid as measured by the second element. The heater is then turned off and the first thermal element monitored. The time it takes the element to return to its initial temperature is measured. This time is directly related to the flow rate. By knowing the thermal element's inherent response time and the thermal conductivity of the liquid, the leak rate can be calculated by comparing the measured time to the known time under no flow conditions. Alternatively, the amount of power needed to maintain the thermal element at the desired temperature is measured. The power needed is directly proportional to the velocity of the liquid past the thermal element.

Referring to FIG. 11, in an alternative method of measuring fluid flow when there is an oscillating flow, two heaters 316, 316a in thermal contact with detection conduit 44 are employed instead of, or in addition to valves 202, 204. Heater 316 is positioned upstream of the fluid flow relative to the position of heater 316a. Thermal elements 110, 112 are positioned next to heater 316, 316a, respectively, to monitor the temperatures of the heaters. The heater temperatures are maintained at the same predetermined temperature elevated above that measured by thermal element 114. The difference in integrated power or net energy required by heaters 316, 316a to maintain the elevated temperature is proportional to net fluid flow and is insensitive to oscillating fluid flow.

In a further embodiment, line leak detector 10 can be used as a stand-alone system, that is, without controller 32. The stand-alone system is capable of determining the integrity of the piping system locally. The algorithms run by controller 32, described above, to determine the pass/fail criteria are instead run, for example, by microprocessor 160 in line leak detector 10. When line leak detector 10 detects a leak, microprocessor 160 sends a flow inhibiting signal which acts to disable the pump. This can be accomplished using various disabling devices, for example, by interrupting power to the pump motor using a relay or solid state switch, by preventing the opening of the deflector plate assembly using a solenoid, or by restricting flow from the pump using a solenoid valve.

Referring to FIGS. 9–9b, in an additional alternative embodiment, a line-leak detector 130 is configured to be installed in pipeline 18. Housing 137 is threaded in regions 134, 135 for installation in pipeline 18. Housing 137 defines a bore 138 for liquid flow. A deflector plate 160 is placed in the center of housing 137 and pivots on a center pin 162. Deflector plate 160 is biased toward a closed testing position (FIGS. 9 and 9a) by a torsion spring 166. A stop 168 is located on the bottom of housing 137 to correctly position deflector plate 160 in its closed position. A thermal element 132 is located within a notch 142 in deflector plate 160. A second thermal element (not shown) is positioned to measure the ambient temperature of fluid upstream from line-leak detector 130. A heater (not shown), heats the fluid in the vicinity of thermal element 132 to a desired temperature above or below the ambient temperature.

During normal liquid dispensing, the force from the flow of the liquid through housing 137 pivots deflector plate 160 into a horizontal flow position (FIG. 9b) to allow maximum liquid flow. The presence of notch 142 in the upper half 170 of deflector plate 160 produces a differential pressure between the upper half 170 and lower half 172 of the deflector plate during liquid flow causing the pivoting action. Deflector plate 160 will return to the closed leak-test position (FIG. 9) via torsion spring 166 during the "off-time" of the dispensing system. In this position, the flow of the liquid is deflected through notch 162 to thermal element 132. The line-leak testing is performed as described above.

Other embodiments are within the claims.

What is claimed is:

1. A flow measuring device for indicating the leak status of a pressurized fluid-carrying line, the fluid-carrying line being pressurized by a pump, comprising:

an electronic leak sensing module connected in fluid communication with the pressurized line and configured for insertion within a detection port of a pump manifold, said module including a thermal sensor effected by flow through the pressurized line, whereby leaks in the pressurized line are detected by monitoring said thermal sensor for changes in output signal that correspond to flow through said pressurized fluid-carrying line, and power lines which provide power to said leak sensing module and over which information is transmitted from said leak sensing module to a system control unit.

2. The flow measuring device of claim 1 further comprising a system control unit for monitoring said electronic leak sensing module and indicating the leak status of the pressurized line.

3. The flow measuring device of claim 1 wherein said information is transmitted by varying a current drawn on said power lines.

4. The flow measuring device of claim 3 wherein the current is drawn as a series of pulses.

5. The flow measuring device of claim 4 wherein said leak sensing module inserts a first and a second gap in said series of pulses, a predetermined number of pulses between said gaps containing information related to leak rate.

6. The flow measuring device of claim 3 further comprising a temperature controller including a heater, said current being drawn by said heater.

7. The flow measuring device of claim 4 wherein the current pulses represent serialized digital data.

8. The flow measuring device of claim 1 wherein said electronic leak sensing module further comprises a housing defining a flow delivery passage having an input and output coupled to said pressurized line and a detection passage coupled to said flow delivery passage, said thermal sensor being located along said detection passage.

9. The flow measuring device of claim 8 wherein said housing further includes a detection conduit enclosing and defining the pathway of said detection passage and said thermal sensor is located on said detection conduit.

10. A flow Measuring device for indicating the leak status of a pressurized fluid-carrying line, the fluid-carrying line being pressurized by a pump, comprising:

an electronic leak sensing module connected in fluid communication with the pressurized line and configured for insertion within a detection port of a pump manifold, said module including a thermal sensor effected by flow through the pressurized line, whereby leaks in the pressurized line are detected by monitoring said thermal sensor for chances in output signal that correspond to flow through said pressurized fluid-carrying line, said module further comprising a housing defining a flow delivery passage having an input and an output coupled to said pressurized line and a detection passage coupled to said flow delivery passage, said thermal sensor being located along said detection passage, a deflector plate disposed in said housing within said flow delivery passage to have a fluid flow switch function, said deflector plate having a first flow deflection position preventing flow through said flow delivery passage while allowing flow through said detection passage and a second flow position allowing flow through said flow delivery passage, and a biasing element for biasing said deflector plate toward said first flow deflection position, fluid flow through said pipeline above a predetermined value causing said deflector plate to move to said second flow position.

11. The flow measuring device of claim 10 wherein said biasing element is a spring.

12. The flow measuring device of claim 10 further including a temperature controller located on said detection conduit for controlling the temperature of said detection conduit.

13. The flow measuring device of claim 12 wherein said temperature controller comprises a heater for heating the detection conduit.

14. The flow measuring device of claim 13 wherein said heater is a coil of nichrome wire wound around said detection conduit.

15. The flow measuring device of claim 13 wherein said thermal sensor comprises a first thermal element located on an upstream side of said heater and a second thermal element located on a downstream side of said heater.

16. A flow measuring device for indicating the leak status of a pressurized fluid-carrying line, the fluid-carrying line being pressurized by a pump, comprising:

an electronic leak sensing module connected in fluid communication with the pressurized line and configured for insertion within a detection port of a pump manifold, said module including a thermal sensor effected by flow through the pressurized line, whereby leaks in the pressurized line are detected by monitoring said thermal sensor for changes in output signal that correspond to flow through said pressurized fluid-carrying line, said electronic leak sensing module further comprising a housing defining a flow delivery passage having an input and an output coupled to said pressurized line and a detection passage coupled to said flow delivery passage, said thermal sensor being located along said detection passage, and a check valve located in a path of fluid entering said detection passage.

17. The flow measuring device of claim 16 wherein said housing defines a channel in fluid communication with said check valve and said detection passage.

18. A flow measuring device for indicating the leak status of a pressurized fluid-carrying line, the fluid-carrying line being pressurized by a pump, comprising:

an electronic leak sensing module connected in fluid communication with the pressurized line and configured for insertion within a detection port of a pump manifold, said module including a thermal sensor effected by flow through the pressurized line, whereby leaks in the pressurized line are detected by monitoring said thermal sensor for chances in output signal that correspond to flow through said pressurized fluid-carrying line, said electronic leak sensing module further comprising a housing defining a flow delivery passage having an input and an output coupled to said pressurized line and a detection passage coupled to said flow delivery passage, said thermal sensor being located along said detection passage, and a relief valve located in the path of fluid entering said detection passage.

19. A flow measuring device for indicating the leak status of a pressurized fluid-carrying line, the fluid-carrying line being pressurized by a pump, comprising:

an electronic leak sensing module connected in fluid communication with the pressurized line and configured for insertion within a detection port of a pump manifold, said module including a thermal sensor effected by flow through the pressurized line, whereby leaks in the pressurized line are detected by monitoring said thermal sensor for changes in output signal that correspond to flow through said pressurized fluid-carrying line, said flow measuring device being a stand-alone unit located in the detection port of the pump manifold.

20. A flow measuring device for indicating the leak status of a pressurized fluid-carrying line, comprising:

an electronic leak sensing module connected in fluid communication with the pressurized line, said module including a thermal sensor effected by flow through the pressurized line, whereby leaks in the pressurized line are detected by monitoring said thermal sensor for changes in output signal that correspond to flow through said pressurized fluid-carrying line, a housing defining a flow delivery passage having an input and an output coupled to said pressurized line and a detection conduit enclosing and defining a detection passage coupled to said flow delivery passage, said thermal sensor being located on said detection conduit, a deflector plate disposed in said housing within said flow delivery passage to have a fluid flow switch function, said deflector plate having a first flow deflection position preventing flow through said flow delivery passage while allowing flow through said detection passage and a second flow position allowing flow through said delivery passage, a biasing element for biasing said deflector plate toward said first flow deflection position, fluid flow through said pipeline above a predetermined value causing said deflector plate to move to said second flow position, a temperature controller located on said detection conduit for controlling the temperature of said detection conduit, said thermal sensor including a first thermal element located on an upstream side of said temperature controller and a second thermal element located on a downstream side of said temperature controller, and a third thermal element located on said housing such that said third thermal element indicates a temperature of said housing which is unaffected by said temperature controller.

21. The flow measuring device of claim 20 wherein said electronic leak sensing module further includes a microprocessor for controlling said heater.

22. The flow measuring device of claim 21 wherein said microprocessor receives a signal from said third thermal element and a signal from said thermal sensor and provides a control signal to said heater representative of a first temperature difference between said detection conduit and said housing to control said heater to establish the first temperature difference at a desired pre-determined value.

23. The flow measuring device of claim 22 wherein said signal from said thermal sensor comprises a signal from said first thermal element representative of a temperature of said detection conduit on said upstream slide of said heater.

24. The flow measuring device of claim 22 wherein said signal from said thermal sensor comprises a signal from said second thermal element representative of a temperature of said detection conduit on said downstream side of said heater.

25. The flow measuring device of claim 22 wherein said signal from said thermal sensor comprises a signal from said first and second thermal elements representative of an average of a temperature of said detection conduit on said upstream side of said heater and a temperature of said detection conduit on said downstream side of said heater.

26. The flow measuring device of claim 22 wherein said control signal comprises a first pulse signal of current pulses of variable pulse widths that are generated at a desired set frequency, the width of each current pulse controlling an amount of electrical energy applied to said heater.

27. The flow measuring device of claim 26 further comprising a system control unit for monitoring said electronic leak sensing module.

28. The flow measuring device of claim 27 wherein said microprocessor receives a signal from said first and second thermal elements representative of a second temperature difference between the temperatures at said downstream and upstream locations of said detection conduit and provides a second pulse signal to said system control unit representative of said second temperature difference.

29. The flow measuring device of claim 28 further including wires which provide power to said leak sensing module, said wires also being used to communicate said second pulse signal from said leak sensing module to said system control unit.

30. The flow measuring device of claim 29 wherein said wires also provide power to a pump for pressurizing said pressurized line.

31. The flow measuring device of claim 29 wherein said microprocessor inserts a first and a second gap into said control signal, said gaps being interruptions in said set frequency in which no pulses are sent to said heater, said second pulse signal being the number of pulses sent to said heater between gaps.

32. The flow measuring device of claim 31 wherein said control unit monitors current drawn by said leak sensing module, a spike in the current drawn occurring during each current pulse of said control signal, said control unit interprets said second pulse signal by counting the number of spikes occurring between said gaps.

33. The flow measuring device of claim 27 further comprising an indicator including:

a two digit display for displaying test information, a first LED for indicating when a leak test is being performed, a second LED for indicating when a leak has been detected, and a test/reset button for starting a test and resetting said device.

34. The flow measuring device of claim 33 wherein said control unit is retrofitable to a relay box associated with a pump for pressurizing said pressurized line.

35. The flow measuring device of claim 34 wherein the pump is a submersible pump for pumping liquid from a tank through the pressurized line to a dispenser, said electronic sensing module being threadably engaged in a line leak port of the pump.

36. A flow measuring device for indicating the leak status of a pressurized fluid-carrying line, comprising:

an electronic leak sensing module connected in fluid communication with the pressurized line, said module including a detection conduit defining a fluid passage in fluid communication with said pressurized line, a first heater in thermal contact with said detection conduit, and a second heater in thermal contact with said detection conduit located downstream of said first heater, a controller for monitoring the energy required by each of said first heater and said second heater to maintain said first and second heaters at a predetermined elevated temperature, said controller determining a difference in energy required to maintain each of said first heater and said second heater at the predetermined elevated temperature, said difference being proportional to flow rate.

37. The flow measuring device of claim 36 further including a first thermal element for monitoring the temperature of said first heater and a second thermal element for monitoring the temperature of said second heater.

38. The flow measuring device of claim 36 wherein the difference in power comprises a difference in integrated power.

* * * * *